(12) United States Patent
Song

(10) Patent No.: US 8,688,843 B2
(45) Date of Patent: Apr. 1, 2014

(54) SELECTIVELY GRANTING A FLOOR DURING SET-UP OF A COMMUNICATION SESSION WITHIN A WIRELESS COMMUNICATIONS SYSTEM

(75) Inventor: Bongyong Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 372 days.

(21) Appl. No.: 12/952,878

(22) Filed: Nov. 23, 2010

(65) Prior Publication Data

US 2012/0131204 A1    May 24, 2012

(51) Int. Cl.
  *G06F 15/16*    (2006.01)
(52) U.S. Cl.
  USPC ............................ 709/227; 709/219; 455/518
(58) Field of Classification Search
  USPC ........................ 709/203, 219, 227; 455/518
  See application file for complete search history.

(56) References Cited

U.S. PATENT DOCUMENTS

| | | | |
|---|---|---|---|
| 2004/0133683 A1* | 7/2004 | Keller et al. | ................... 709/227 |
| 2005/0090228 A1 | 4/2005 | Black | |
| 2006/0003781 A1 | 1/2006 | Jin et al. | |
| 2006/0046760 A1* | 3/2006 | Bertino et al. | ................. 455/519 |
| 2008/0153538 A1 | 6/2008 | O'shaughnessy et al. | |
| 2009/0080356 A1 | 3/2009 | Song et al. | |

FOREIGN PATENT DOCUMENTS

| | | |
|---|---|---|
| WO | WO2006075873 A1 | 7/2006 |
| WO | WO2006091000 A1 | 8/2006 |
| WO | WO2009026057 A1 | 2/2009 |
| WO | WO2009126072 A1 | 10/2009 |
| WO | WO2010111051 | 9/2010 |

OTHER PUBLICATIONS

International Search Report and Written Opinion—PCT/US2011/061516—ISA/EPO—Mar. 22, 2012.
Raktale S.K., "3PoC : an architecture for enabling push to talk services in 3GPP networks", Personal Wireless Communications, 2005. ICPWC 2005. 2005 IEEE Internat Ional Conference on New Delhi, India Jan. 23-25, 2005, Piscataway, NJ, USA,IEEE, Jan. 23, 2005, pp. 202-206, XP010798546, DOI: 10.1109/ICPWC.2005.1431332 ISBN: 978-0-7803-8964-9.

* cited by examiner

*Primary Examiner* — El Hadji Sall
(74) *Attorney, Agent, or Firm* — Raphael Freiwirth

(57) ABSTRACT

An embodiment is directed to an application server configured to set-up a communication session within a wireless communications system. The application server receives, from a session originator, a request to initiate the communication session with a set of session targets, and then transmits one or more call announcement messages for announcing the communication session to the set of session targets. The application server determines information associated with a probability that the set of session targets will fail to accept the announced communication session, and/or delay information associated with when call responses will arrive from the set of session targets in response to the one or more call announcement messages. The application server selectively grants a floor of the communication session to the session originator based on the determined information.

20 Claims, 20 Drawing Sheets

SELECTIVELY GRANTING A FLOOR DURING SET-UP OF A COMMUNICATION SESSION WITHIN A WIRELESS COMMUNICATIONS SYSTEM

BACKGROUND OF THE INVENTION

1. Field of the Invention

Embodiments of the invention relate to selectively granting a floor during set-up of a communication session within a wireless communications system.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (W-CDMA), CDMA2000 (such as CDMA2000 1xEV-DO standards, for example) or TD-SCDMA.

In W-CDMA wireless communication systems, user equipments (UEs) receive signals from fixed position Node Bs (also referred to as cell sites or cells) that support communication links or service within particular geographic regions adjacent to or surrounding the base stations. Node Bs provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the Node Bs generally interact with UEs through an over the air interface and with the RAN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as W-CDMA, CDMA, FDMA, OFDM/OFDMA, TDMA, GSM, etc. In a dispatch model, communication between endpoints (e.g., UEs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

SUMMARY

An embodiment is directed to an application server configured to set-up a communication session within a wireless communications system. The application server receives, from a session originator, a request to initiate the communication session with a set of session targets, and then transmits one or more call announcement messages for announcing the communication session to the set of session targets. The application server determines information associated with a probability that the set of session targets will fail to accept the announced communication session, and/or delay information associated with when call responses will arrive from the set of session targets in response to the one or more call announcement messages. The application server selectively grants a floor of the communication session to the session originator based on the determined information.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

DETAILED DESCRIPTION

Figure 1:
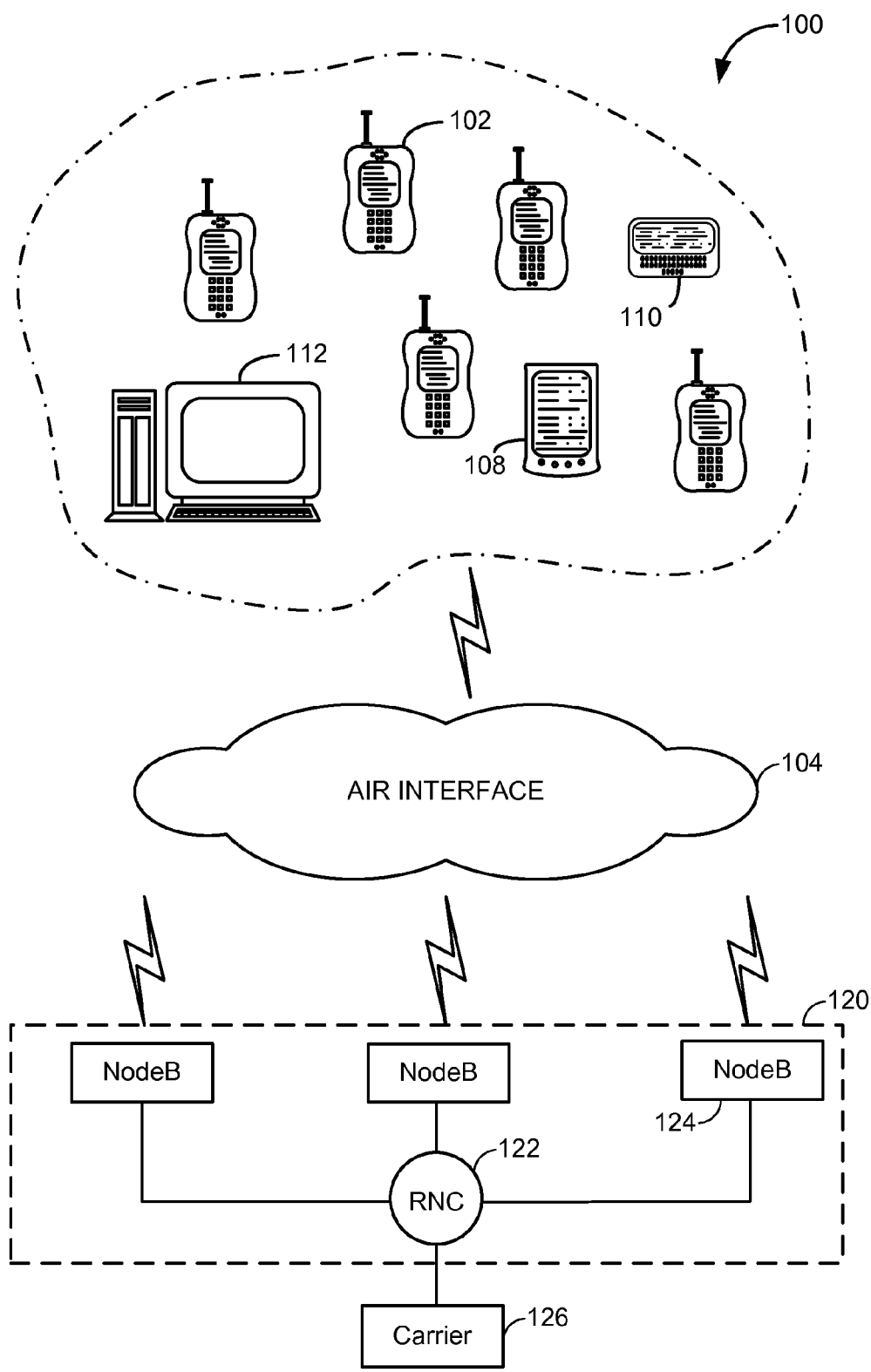
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as a user equipment (UE), may be mobile or stationary, and may communicate with one or more access points (APs), which may be referred to as Node Bs. A UE transmits and receives data packets through one or more of the Node Bs to a Radio Network Controller (RNC). The Node Bs and RNC are parts of a network called a radio access network (RAN). A radio access network can transport voice and data packets between multiple access terminals.

The radio access network may be further connected to additional networks outside the radio access network, such core network including specific carrier related servers and devices and connectivity to other networks such as a corporate intranet, the Internet, public switched telephone network (PSTN), a Serving General Packet Radio Services (GPRS) Support Node (SGSN), a Gateway GPRS Support Node (GGSN), and may transport voice and data packets between each UE and such networks. A UE that has established an active traffic channel connection with one or more Node Bs may be referred to as an active UE, and can be referred to as being in a traffic state. A UE that is in the process of establishing an active traffic channel (TCH) connection with one or more Node Bs can be referred to as being in a connection setup state. A UE may be any data device that communicates through a wireless channel or through a wired channel. A UE may further be any of a number of types of devices including but not limited to PC card, compact flash device, external or internal modem, or wireless or wireline phone. The communication link through which the UE sends signals to the Node B(s) is called an uplink channel (e.g., a reverse traffic channel, a control channel, an access channel, etc.). The communication link through which Node B(s) send signals to a UE is called a downlink channel (e.g., a paging channel, a control channel, a broadcast channel, a forward traffic channel, etc.). As used herein the term traffic channel (TCH) can refer to either an uplink/reverse or downlink/forward traffic channel.

FIG. 1 illustrates a block diagram of one exemplary embodiment of a wireless communications system 100 in accordance with at least one embodiment of the invention. System 100 can contain UEs, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or core network 126) and the UEs 102, 108, 110, 112. As shown here, the UE can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the term "UE" in other communication protocols (i.e., other than W-CDMA) may be referred to interchangeably as an "access terminal", "AT", "wireless device", "client device", "mobile terminal", "mobile station" and variations thereof.

Referring back to FIG. 1, the components of the wireless communications system 100 and interrelation of the elements of the exemplary embodiments of the invention are not limited to the configuration illustrated. System 100 is merely exemplary and can include any system that allows remote UEs, such as wireless client computing devices 102, 108, 110, 112 to communicate over-the-air between and among each other and/or between and among components connected via the air interface 104 and RAN 120, including, without limitation, core network 126, the Internet, PSTN, SGSN, GGSN and/or other remote servers.

The RAN 120 controls messages (typically sent as data packets) sent to a RNC 122. The RNC 122 is responsible for signaling, establishing, and tearing down bearer channels (i.e., data channels) between a Serving General Packet Radio Services (GPRS) Support Node (SGSN) and the UEs 102/108/110/112. If link layer encryption is enabled, the RNC 122 also encrypts the content before forwarding it over the air interface 104. The function of the RNC 122 is well-known in the art and will not be discussed further for the sake of brevity. The core network 126 may communicate with the RNC 122 by a network, the Internet and/or a public switched telephone network (PSTN). Alternatively, the RNC 122 may connect directly to the Internet or external network. Typically, the network or Internet connection between the core network 126 and the RNC 122 transfers data, and the PSTN transfers voice information. The RNC 122 can be connected to multiple Node Bs 124. In a similar manner to the core network 126, the RNC 122 is typically connected to the Node Bs 124 by a network, the Internet and/or PSTN for data transfer and/or voice information. The Node Bs 124 can broadcast data messages wirelessly to the UEs, such as cellular telephone 102. The Node Bs 124, RNC 122 and other components may form the RAN 120, as is known in the art. However, alternate configurations may also be used and the invention is not limited to the configuration illustrated. For example, in another embodiment the functionality of the RNC 122 and one or more of the Node Bs 124 may be collapsed into a single "hybrid" module having the functionality of both the RNC 122 and the Node B(s) 124.

Figure 2A:
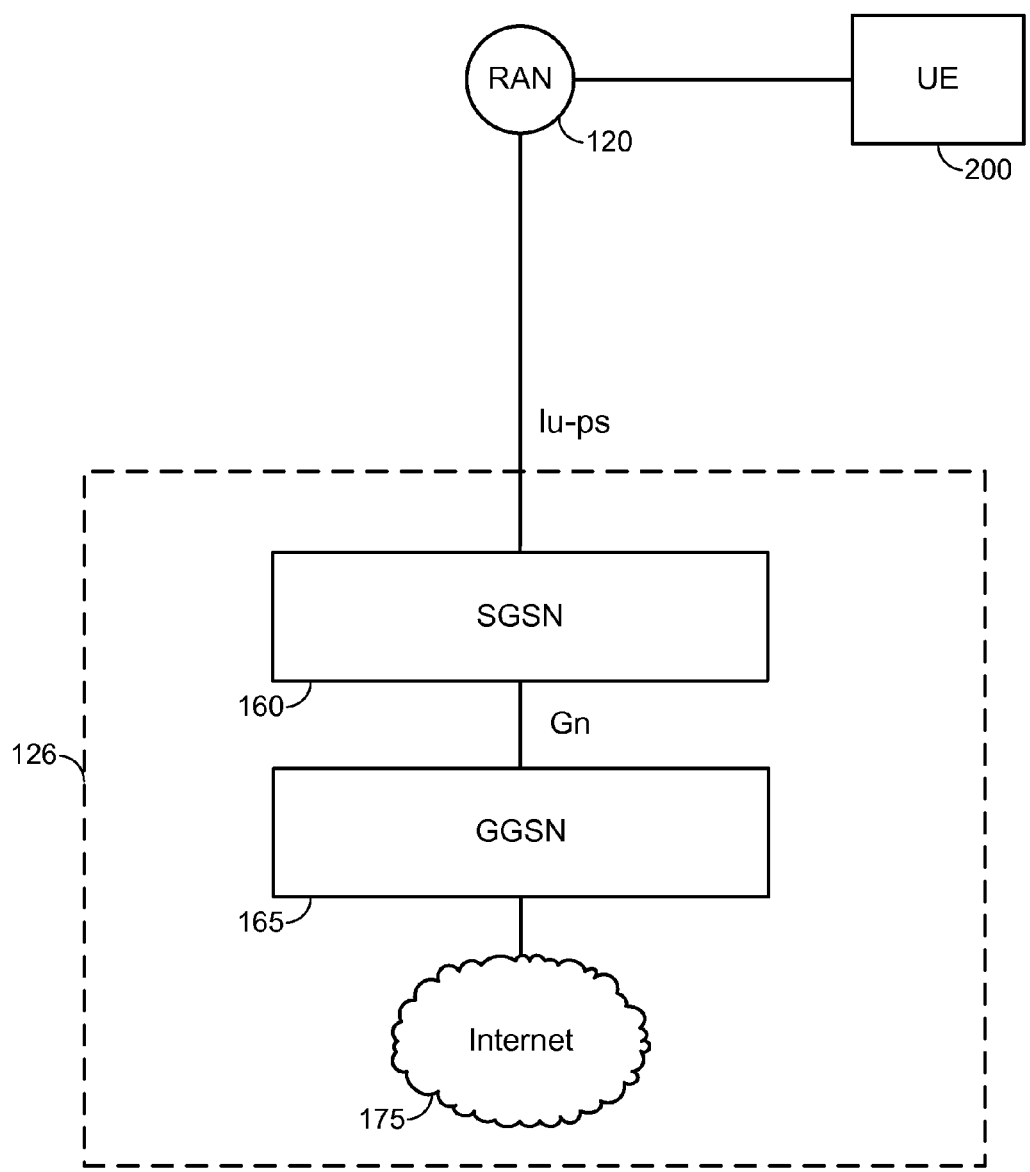
FIG. 2A illustrates the core network of FIG. 1 according to an embodiment of the present invention.

FIG. 2A illustrates the core network 126 according to an embodiment of the present invention. In particular, FIG. 2A illustrates components of a General Packet Radio Services (GPRS) core network implemented within a W-CDMA system. In the embodiment of FIG. 2A, the core network 126 includes a Serving GPRS Support Node (SGSN) 160, a Gateway GPRS Support Node (GGSN) 165 and an Internet 175. However, it is appreciated that portions of the Internet 175 and/or other components may be located outside the core network in alternative embodiments.

Generally, GPRS is a protocol used by Global System for Mobile communications (GSM) phones for transmitting Internet Protocol (IP) packets. The GPRS Core Network (e.g., the GGSN 165 and one or more SGSNs 160) is the centralized part of the GPRS system and also provides support for W-CDMA based 3G networks. The GPRS core network is an integrated part of the GSM core network, provides mobility management, session management and transport for IP packet services in GSM and W-CDMA networks.

The GPRS Tunneling Protocol (GTP) is the defining IP protocol of the GPRS core network. The GTP is the protocol which allows end users (e.g., access terminals) of a GSM or W-CDMA network to move from place to place while continuing to connect to the internet as if from one location at the GGSN 165. This is achieved transferring the subscriber's data from the subscriber's current SGSN 160 to the GGSN 165, which is handling the subscriber's session.

Three forms of GTP are used by the GPRS core network; namely, (i) GTP-U, (ii) GTP-C and (iii) GTP' (GTP Prime). GTP-U is used for transfer of user data in separated tunnels for each packet data protocol (PDP) context. GTP-C is used for control signaling (e.g., setup and deletion of PDP contexts, verification of GSN reach-ability, updates or modifications such as when a subscriber moves from one SGSN to another, etc.). GTP' is used for transfer of charging data from GSNs to a charging function.

Referring to FIG. 2A, the GGSN 165 acts as an interface between the GPRS backbone network (not shown) and the external packet data network 175. The GGSN 165 extracts the packet data with associated packet data protocol (PDP) format (e.g., IP or PPP) from the GPRS packets coming from the SGSN 160, and sends the packets out on a corresponding packet data network. In the other direction, the incoming data packets are directed by the GGSN 165 to the SGSN 160 which manages and controls the Radio Access Bearer (RAB) of the destination UE served by the RAN 120. Thereby, the GGSN 165 stores the current SGSN address of the target UE and his/her profile in its location register (e.g., within a PDP context). The GGSN is responsible for IP address assignment and is the default router for the connected UE. The GGSN also performs authentication and charging functions.

The SGSN 160 is representative of one of many SGSNs within the core network 126, in an example. Each SGSN is responsible for the delivery of data packets from and to the UEs within an associated geographical service area. The tasks of the SGSN 160 includes packet routing and transfer, mobility management (e.g., attach/detach and location management), logical link management, and authentication and charging functions. The location register of the SGSN stores location information (e.g., current cell, current VLR) and user profiles (e.g., IMSI, PDP address(es) used in the packet data network) of all GPRS users registered with the SGSN 160, for example, within one or more PDP contexts for each user or UE. Thus, SGSNs are responsible for (i) de-tunneling downlink GTP packets from the GGSN 165, (ii) uplink tunnel IP packets toward the GGSN 165, (iii) carrying out mobility management as UEs move between SGSN service areas and (iv) billing mobile subscribers. As will be appreciated by one of ordinary skill in the art, aside from (i)-(iv), SGSNs configured for GSM/EDGE networks have slightly different functionality as compared to SGSNs configured for W-CDMA networks.

The RAN 120 (e.g., or UTRAN, in Universal Mobile Telecommunications System (UMTS) system architecture) communicates with the SGSN 160 via a Iu interface, with a transmission protocol such as Frame Relay or IP. The SGSN 160 communicates with the GGSN 165 via a Gn interface, which is an IP-based interface between SGSN 160 and other SGSNs (not shown) and internal GGSNs, and uses the GTP protocol defined above (e.g., GTP-U, GTP-C, GTP', etc.). While not shown in FIG. 2A, the Gn interface is also used by the Domain Name System (DNS). The GGSN 165 is connected to a Public Data Network (PDN) (not shown), and in turn to the Internet 175, via a Gi interface with IP protocols either directly or through a Wireless Application Protocol (WAP) gateway.

The PDP context is a data structure present on both the SGSN 160 and the GGSN 165 which contains a particular UE's communication session information when the UE has an active GPRS session. When a UE wishes to initiate a GPRS communication session, the UE must first attach to the SGSN 160 and then activate a PDP context with the GGSN 165. This allocates a PDP context data structure in the SGSN 160 that the subscriber is currently visiting and the GGSN 165 serving the UE's access point.

Figure 2B:
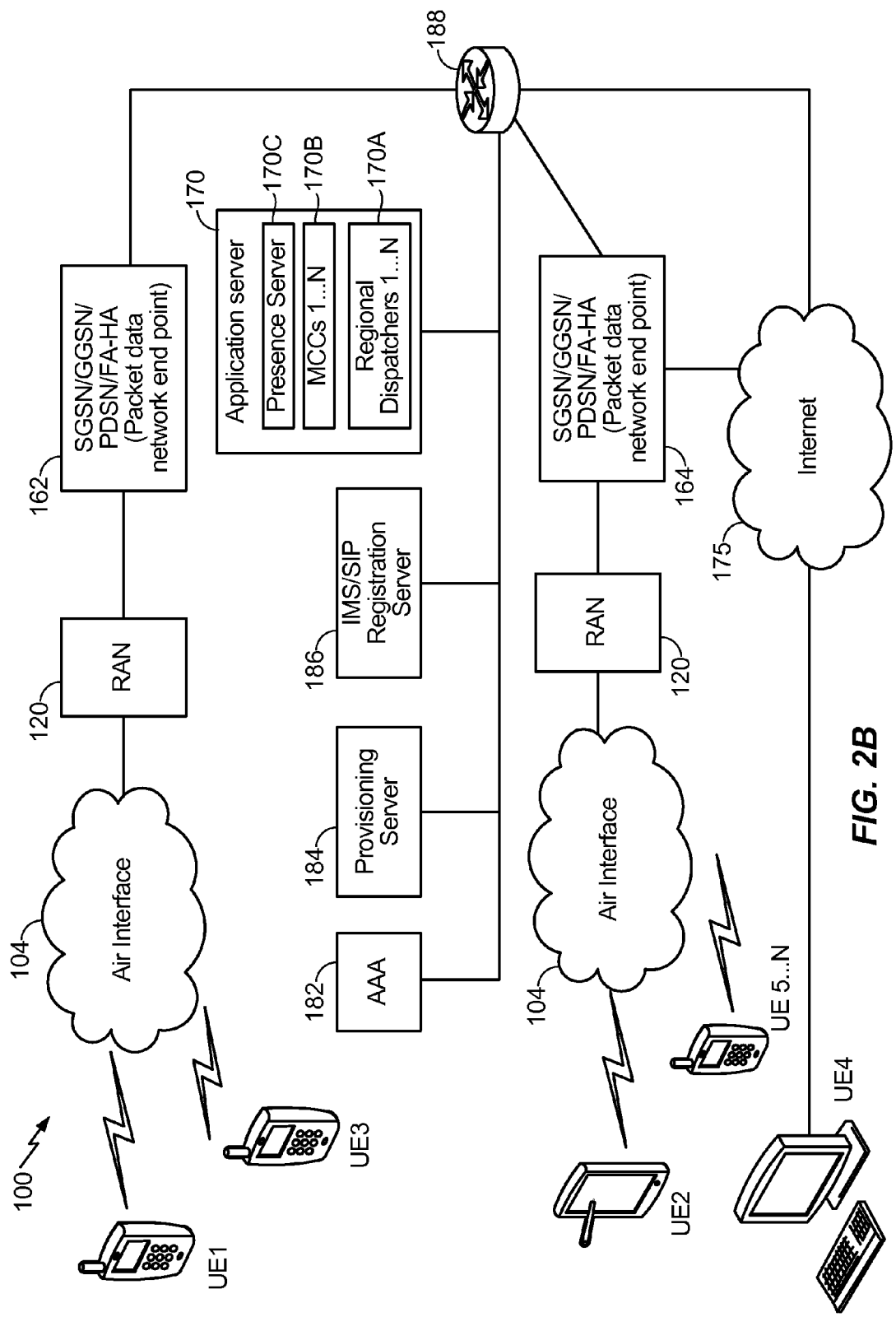
FIG. 2B illustrates an example of the wireless communications system 100 of FIG. 1 in more detail.

FIG. 2B illustrates an example of the wireless communications system 100 of FIG. 1 in more detail. In particular, referring to FIG. 2B, UEs 1 . . . N are shown as connecting to the RAN 120 at locations serviced by different packet data network end-points. The illustration of FIG. 2B is specific to W-CDMA systems and terminology, although it will be appreciated how FIG. 2B could be modified to confirm with a 1x EV-DO system. Accordingly, UEs 1 and 3 connect to the RAN 120 at a portion served by a first packet data network end-point 162 (e.g., which may correspond to SGSN, GGSN, PDSN, a home agent (HA), a foreign agent (FA), etc.). The first packet data network end-point 162 in turn connects, via the routing unit 188, to the Internet 175 and/or to one or more of an authentication, authorization and accounting (AAA) server 182, a provisioning server 184, an Internet Protocol (IP) Multimedia Subsystem (IMS)/Session Initiation Protocol (SIP) Registration Server 186 and/or the application server 170. UEs 2 and 5 . . . N connect to the RAN 120 at a portion served by a second packet data network end-point 164 (e.g., which may correspond to SGSN, GGSN, PDSN, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. UE 4 connects directly to the Internet 175, and through the Internet 175 can then connect to any of the system components described above.

Referring to FIG. 2B, UEs 1, 3 and 5 . . . N are illustrated as wireless cell-phones, UE 2 is illustrated as a wireless tablet-PC and UE 4 is illustrated as a wired desktop station. However, in other embodiments, it will be appreciated that the wireless communication system 100 can connect to any type of UE, and the examples illustrated in FIG. 2B are not intended to limit the types of UEs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of regional dispatchers 1 . . . N 170A, a plurality of media control complexes (MCCs) 1 . . . N 170B, and one or more Presence Servers 170C. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between UEs located anywhere within the system 100, multiple regional dispatchers 170A and MCCs 170B are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the UEs, scheduling and/or sending announce messages, etc.), whereas the MCCs 170B are responsible for hosting the communication session for the duration of the call instance, including conducting an in-call signaling and an actual exchange of media during an arbitrated communication session. The presence server(s) 170C offer a presence service to accept, store and distribute presence information of users/UEs.

Figure 3:
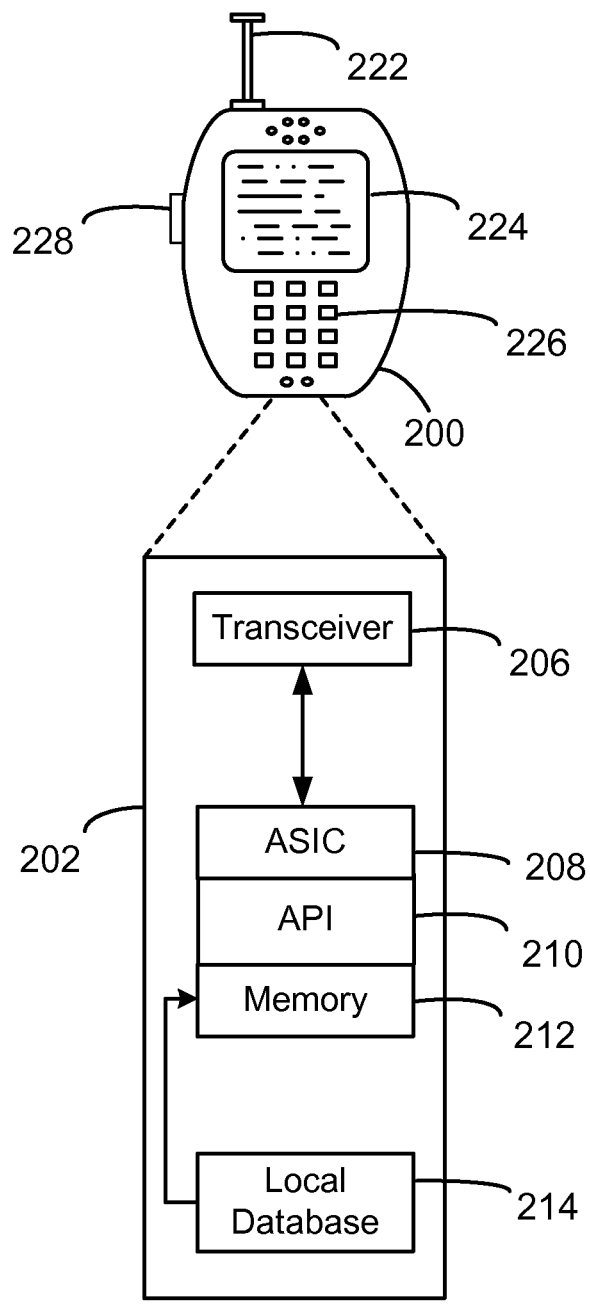
FIG. 3 is an illustration of an access terminal in accordance with at least one embodiment of the invention.

Referring to FIG. 3, a UE 200, (here a wireless device), such as a cellular telephone, has a platform 202 that can receive and execute software applications, data and/or commands transmitted from the RAN 120 that may ultimately come from the core network 126, the Internet and/or other remote servers and networks. The platform 202 can include a transceiver 206 operably coupled to an application specific integrated circuit (ASIC) 208, or other processor, microprocessor, logic circuit, or other data processing device. The ASIC 208 or other processor executes the application programming interface (API) 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include a UE including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the UE 200 in FIG. 3 are to be considered merely illustrative and the invention is not limited to the illustrated features or arrangement.

The wireless communication between the UE 102 or 200 and the RAN 120 can be based on different technologies, such as code division multiple access (CDMA), W-CDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. For example, in W-CDMA, the data communication is typically between the client device 102, Node B(s) 124, and the RNC 122. The RNC 122 can be connected to multiple data networks such as the core network 126, PSTN, the Internet, a virtual private network, a SGSN, a GGSN and the like, thus allowing the UE 102 or 200 access to a broader communication network. As discussed in the foregoing and known in the art, voice transmission and/or data can be transmitted to the UEs from the RAN using a variety of networks and configurations. Accordingly, the illustrations provided herein are not intended to limit the embodiments of the invention and are merely to aid in the description of aspects of embodiments of the invention.

Below, embodiments of the invention are generally described in accordance with W-CDMA protocols and associated terminology (e.g., such as UE instead of mobile station (MS), mobile unit (MU), access terminal (AT), etc., RNC, contrasted with BSC in EV-DO, or Node B, contrasted with BS or MPT/BS in EV-DO, etc.). However, it will be readily appreciated by one of ordinary skill in the art how the embodiments of the invention can be applied in conjunction with wireless communication protocols other than W-CDMA.

In a conventional server-arbitrated communication session (e.g., via half-duplex protocols, full-duplex protocols, VoIP, a group session over IP unicast, a group session over IP multicast, a push-to-talk (PTT) session, a push-to-transfer (PTX) session, etc.), a session or call originator sends a request to initiate a communication session to the application server 170, which then forwards a call announcement message to the RAN 120 for transmission to one or more targets of the communication session.

In an example implementation, referred to as Guaranteed Talk Permit (GTP), the application server 170 waits to receive at least one accept call message from one of the session targets. Upon receiving the at least one accept call message, the application server 170 is aware that at least one session target has agreed to accept or participate in the communication session with the session originator. At this point, the application server 170 sends a floor-grant message to the session originator to allocate the floor. As will be appreciated, the GTP-type floor-grant mechanism or protocol helps to avoid a 'false-grant' scenario whereby the floor is granted and then no session targets actually join or accept the session (resulting in call-failure). Examples of setting up communication sessions in accordance with the GTP-type floor-grant mechanism or protocol are described below with respect to FIGS. 4A and 4B.

Figure 4A:
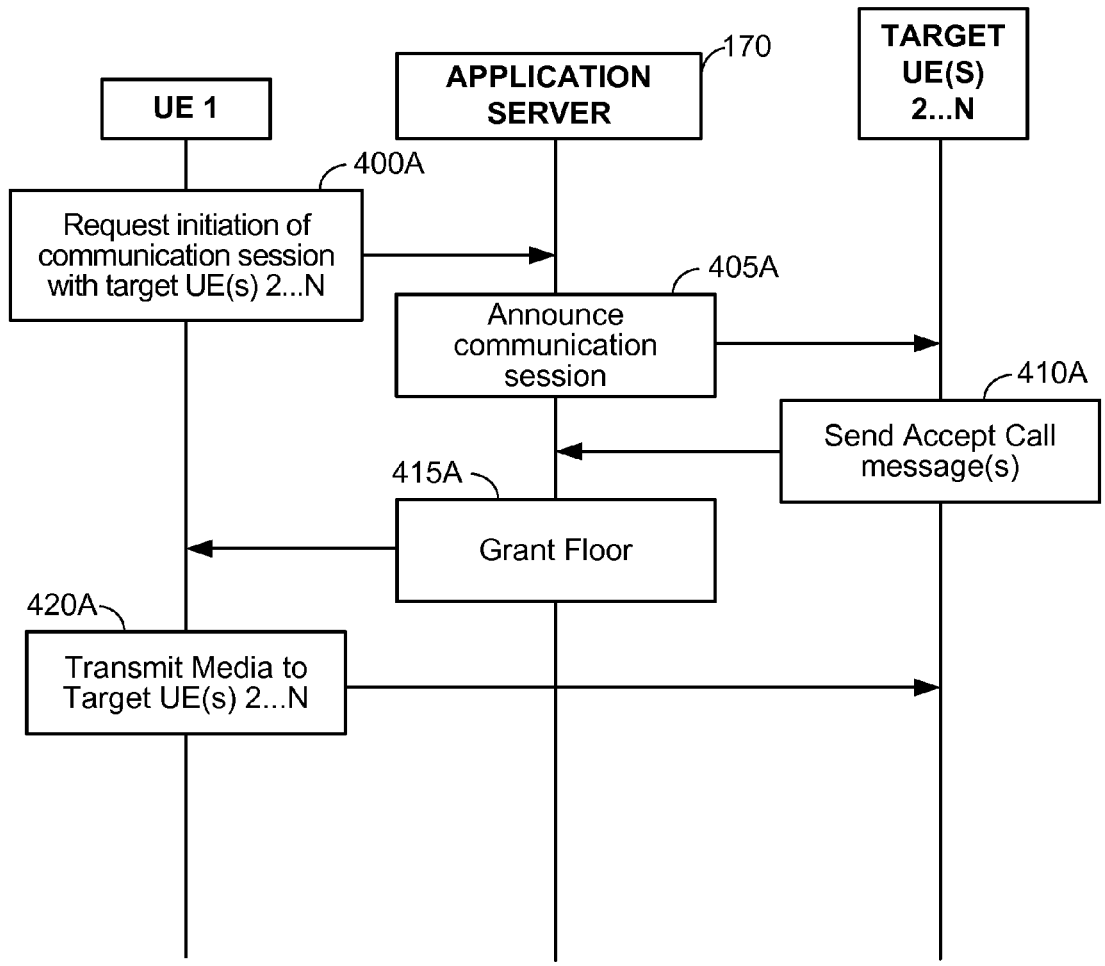
FIG. 4A illustrates a process of setting up a communication sessions in accordance with a Guaranteed Talk Permit (GTP)-type floor-grant mechanism or protocol.

Referring to FIG. 4A, a session originator ("UE 1") sends, to the application server 170, a request to initiate a communication session with target UE(s) 2 . . . N, 400A. In an example, if N=2, the communication session is intended to be a direct or one-to-one communication session (i.e., between UE 1 and one other UE) that is likely to be supported by the application server 170 via IP unicasting. Otherwise, if N>2, the communication session corresponds to a group communication session that can be supported by the application server 170 via IP unicasting, IP multicasting and/or a combination thereof.

The application server 170 receives the session initiation request from UE 1 and transmits one or more call announcement messages to target UE(s) 2 . . . N for announcing the communication session, 405A. Because FIG. 4A is directed to an example of call set-up in accordance with the GTP-type floor-grant mechanism or protocol, the application server 170 does not send a floor-grant message to UE 1 at this point, but rather waits to receive at least one accept call message from target UE(s) 2 . . . N. In 410A, the application server 170 receives one or more accept call messages from target UE(s) 2 . . . N. Accordingly, the application server 170 sends the floor-grant message to UE 1, 415A, after which UE 1 (i.e., the floor-holder of the communication session) begins to transmit media to the application server 170 for transmission to target UE(s) 2 . . . N (or at least so many of target UE(s) 2 . . . N that have ACKed the announce message), 420A.

Figure 4B:
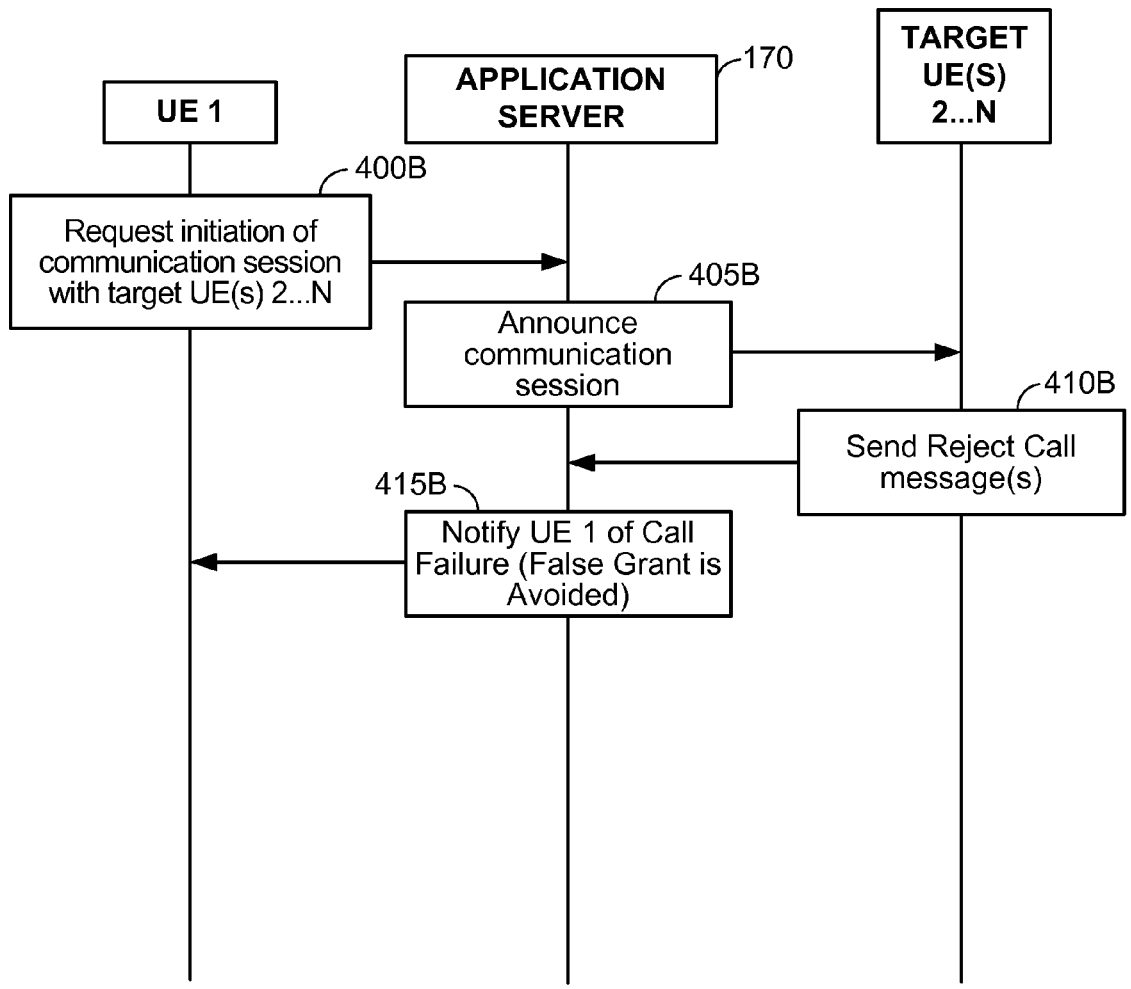
FIG. 4B illustrates another process of setting up a communication sessions in accordance with a GTP-type floor-grant mechanism or protocol.

Referring to FIG. 4B, a session originator ("UE 1") sends, to the application server 170, a request to initiate a communication session with target UE(s) 2 . . . N, 400B. The application server 170 receives the session initiation request from UE 1 and transmits one or more call announcement messages to target UE(s) 2 . . . N for announcing the communication session, 405B. Because FIG. 4B is directed to an example of call set-up in accordance with the GTP-type floor-grant mechanism or protocol, the application server 170 does not send a floor-grant message to UE 1 at this point, but rather waits to receive at least one accept call message from target UE(s) 2 . . . N. In 410B, instead of receiving accept call message(s) from target UE(s) 2 . . . N, assume that the target UE(s) 2 . . . N do not respond to the call announcement message(s) with accept call message(s).

As shown in 410B, the failure to provide an accept call message to the application server 170 can correspond to an affirmative rejection of the communication session whereby the target UE(s) 2 . . . N send reject call message(s) to the application server 170. Alternatively, while not shown in FIG. 4B, the failure to provide an accept call message in 410B can correspond to a failure to ACK the call announcement message at all, whereby the application server 170 infers that a session target will not be joining the communication session after a threshold period of time without receiving any response to the call announcement message.

Referring to FIG. 4B, the application server 170 infers from the response (or lack thereof) of 410B that the communication session requested for initiation by UE 1 cannot be set-up successfully. Accordingly, the application server 170 notifies UE 1 of call failure, 415B. As will be appreciated, no floor-grant message is sent to UE 1 during the process of FIG. 4B.

As will be appreciated from the description of FIGS. 4A and 4B, set-up of communication sessions in accordance with the GTP-type floor-grant mechanism or protocol reduces an occurrence of a 'false-grant' scenario (e.g., no floor-grant is sent in FIG. 4B when target UE(s) 2 . . . N do not accept the session) but also increases the time it takes to set-up the communication session (e.g., the floor-grant in FIG. 4A is only sent after an accept call message is received from a target UE).

An alternative to setting up communication sessions in accordance with the GTP-type floor-grant mechanism or protocol is referred to as Optimistic Talk Permit (OTP). In an OTP-type floor-grant mechanism or protocol, the application server 170 sends a floor-grant message to the session originator without waiting to receive at least one accept call message from the session targets. Thus, if one or more accept call messages eventually arrive at the application server 170 from the session targets, the communication session is set-up more quickly at the originator than under the GTP-type floor-grant mechanism or protocol due to the preemptive floor-grant to the session originator. However, if no accept call messages arrive at the application server 170 from the session targets, the call fails and a false-grant scenario occurs, which degrades the user experience (e.g., the session originator may have already begun speaking only to find out at a later point in time that his/her call never actually connected to the target UE(s)). Examples of setting up communication sessions in accordance with the OTP-type floor-grant mechanism or protocol are described below with respect to FIGS. 5A and 5B.

Figure 5A:
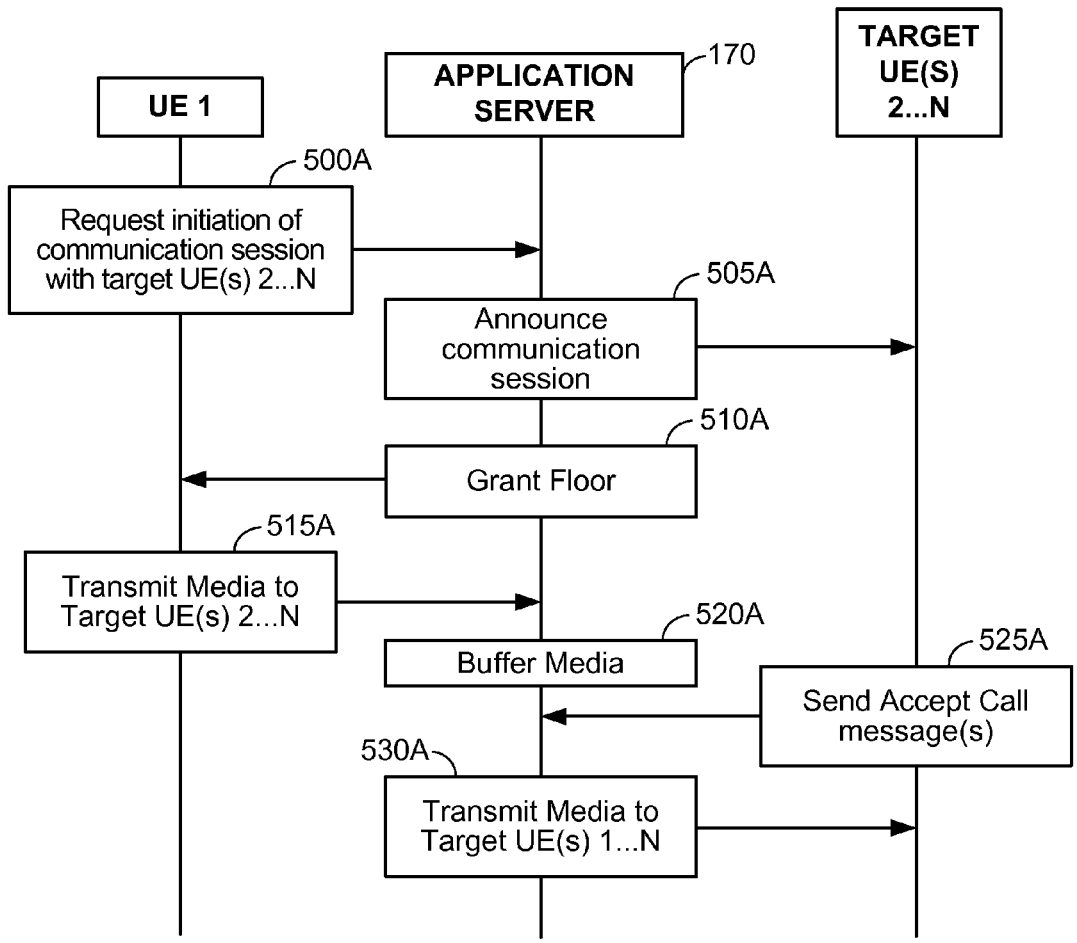
FIG. 5A illustrates a process of setting up a communication sessions in accordance with an Optimistic Talk Permit (OTP)-type floor-grant mechanism or protocol.

Referring to FIG. 5A, a session originator ("UE 1") sends, to the application server 170, a request to initiate a communication session with target UE(s) 2 . . . N, 500A. In an example, if N=2, the communication session is intended to be a direct or one-to-one communication session (i.e., between UE 1 and one other UE) that is likely to be supported by the application server 170 via IP unicasting. Otherwise, if N>2, the communication session corresponds to a group communication session that can be supported by the application server 170 via IP unicasting, IP multicasting and/or a combination thereof.

The application server 170 receives the session initiation request from UE 1 and transmits one or more call announcement messages to target UE(s) 2 . . . N for announcing the communication session, 505A. Because FIG. 5A is directed to an example of call set-up in accordance with the OTP-type floor-grant mechanism or protocol, the application server 170 sends a floor-grant message to UE 1 at this point, 510A, instead of waiting to receive at least one accept call message from target UE(s) 2 . . . N. In 515A, after UE 1 receives the floor-grant message, UE 1 (i.e., the floor-holder of the communication session) begins to transmit media to the application server 170 for transmission to target UE(s) 2 . . . N (at least, the target UE(s) 2 . . . N that have accepted the announced communication session).

At this point, no accept call messages have been received by the application server 170, and the application server 170 buffers the media from UE 1 while waiting for an accept call message, 520A. In 525A, the application server 170 receives one or more accept call messages from target UE(s) 2 . . . N. Accordingly, the application server 170 sends the buffered media (and any other media arriving from UE 1) to target UE(s) 2 . . . N (at least, the target UE(s) 2 . . . N that have accepted the announced communication session), 530A.

Figure 5B:
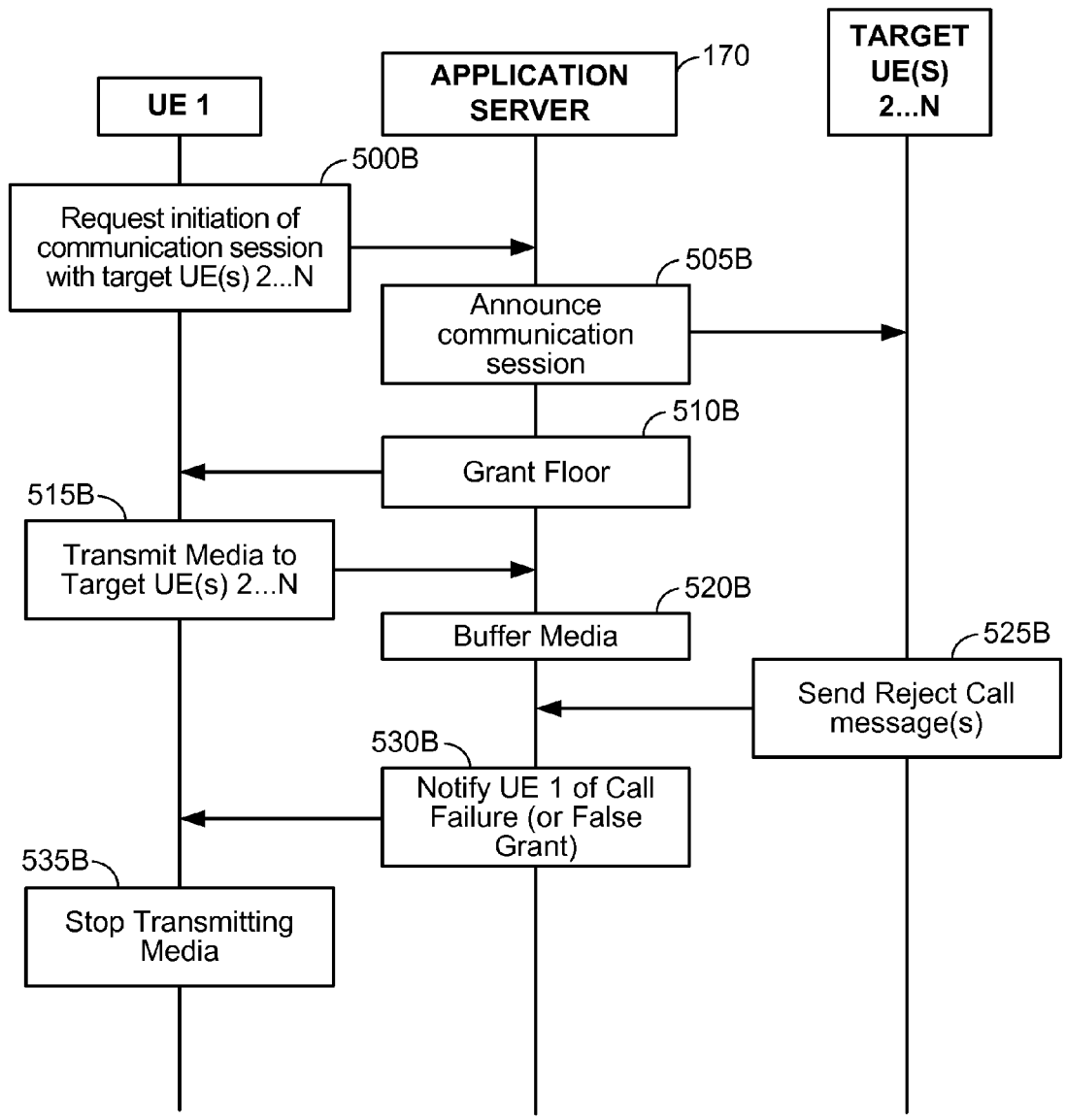
FIG. 5B illustrates another process of setting up a communication sessions in accordance with an OTP-type floor-grant mechanism or protocol.

Referring to FIG. 5B, a session originator ("UE 1") sends, to the application server 170, a request to initiate a communication session with target UE(s) 2 . . . N, 500B. The application server 170 receives the session initiation request from UE 1 and transmits one or more call announcement messages to target UE(s) 2 . . . N for announcing the communication session, 505B. Because FIG. 5B is directed to an example of call set-up in accordance with the OTP-type floor-grant mechanism or protocol, the application server 170 sends a floor-grant message to UE 1 at this point, 510B, instead of waiting to receive at least one accept call message from target UE(s) 2 . . . N. In 515B, after UE 1 receives the floor-grant message, UE 1 (i.e., the floor-holder of the communication session) begins to transmit media to the application server 170 for transmission to target UE(s) 2 . . . N (at least, the target UE(s) 2 . . . N that have accepted the announced communication session), 515B.

At this point, no accept call messages have been received by the application server 170, and the application server 170 buffers the media from UE 1 while waiting for an accept call message, 520B. In 525B, instead of receiving accept call message(s) from target UE(s) 2 . . . N, assume that the target UE(s) 2 . . . N do not respond to the call announcement message(s) with accept call message(s) (e.g., similar to 410B of FIG. 4B, where the failure to transmit an accept call message can correspond to a failure to send any type of response or ACK at all or to a transmission of a reject call message).

Referring to FIG. 5B, the application server 170 infers from the response (or lack thereof) of 525B that the communication session requested for initiation by UE 1 cannot be set-up successfully. Accordingly, the application server 170 notifies UE 1 of call failure and drops or flushes the buffered media of 520B from memory, 530B. UE 1 receives the notification of call failure and stops transmitting media to the application server 170, 535B.

As will be appreciated from the description of FIGS. 5A and 5B, set-up of communication sessions in accordance with the OTP-type floor-grant mechanism or protocol reduces the set-up time for communication sessions as shown in FIG. 5A, but also increases occurrences of 'false-grant' scenarios as shown in FIG. 5B.

Conventionally, network operators are forced to choose either OTP-type or GTP-type floor-grant mechanisms or protocols for supporting set-up of communication sessions within a wireless communications network. Embodiments of the invention are directed to a selective implementation of OTP-type or GTP-type floor-grant mechanisms or protocols during set-up of a communication session. As will be described in more detail below, embodiments are directed to implementing the OTP-type floor-grant mechanism or protocol for session set-up of communication sessions with a relatively high expectation or probability of being set-up successfully, and implementing the GTP-type floor-grant mechanism or protocol for session set-up of communication sessions with a relatively low expectation or probability of being set-up successfully. In at least one embodiment, information associated with the probability or expectation of successfully setting-up communication sessions can be used to take advantage of the respective benefits of OTP-type or GTP-type floor-grant mechanisms or protocols while mitigating the respective negative aspects of OTP-type or GTP-type floor-grant mechanisms or protocols.

Figure 6:
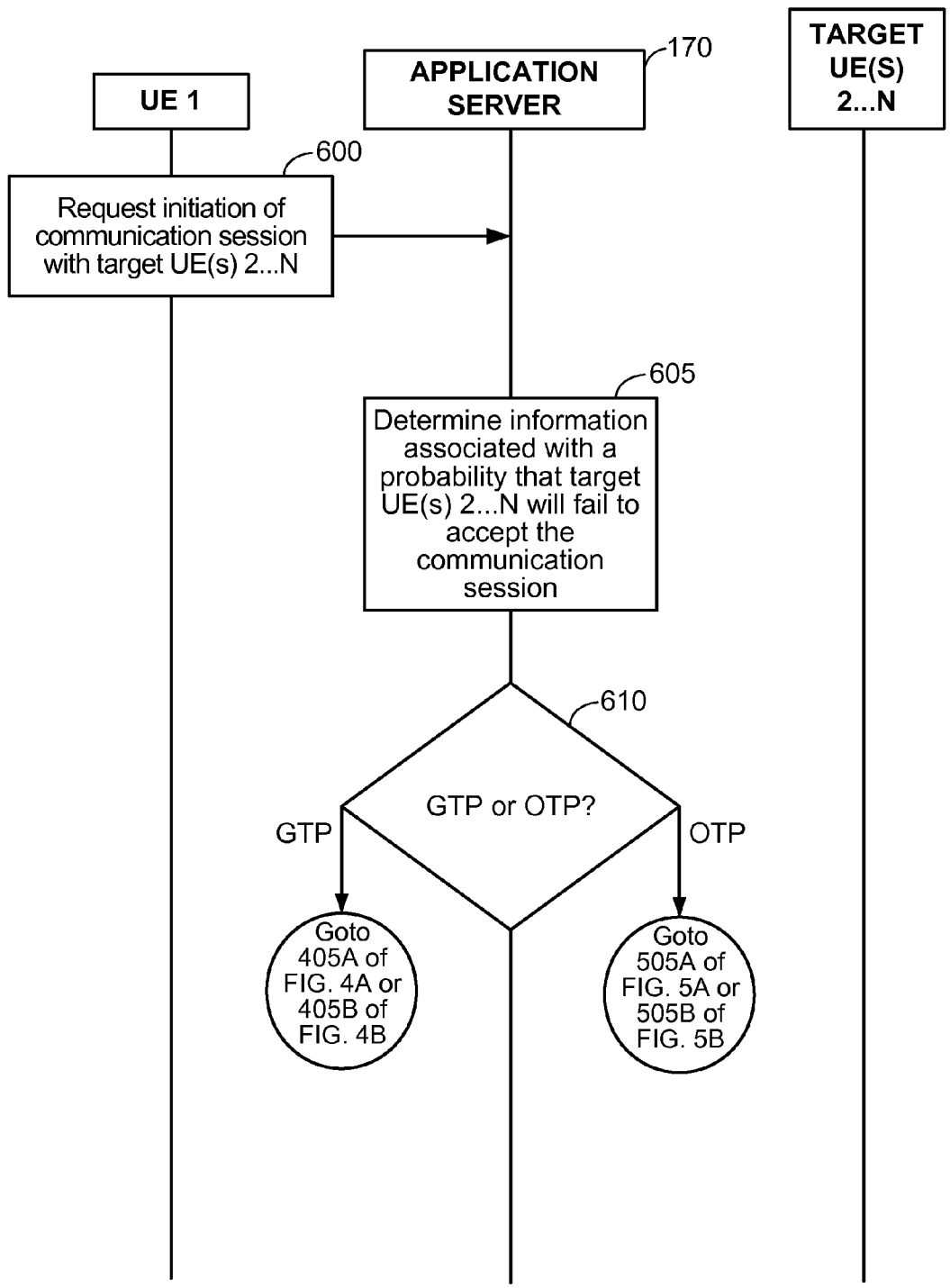
FIG. 6 illustrates a process of selectively granting a floor to an originator of a communication session in accordance with an embodiment of the invention.

FIG. 6 illustrates a process of selectively granting a floor to an originator ("UE 1") of a communication session in accordance with an embodiment of the invention. In particular, FIG. 6 illustrates an example implementation whereby the floor is selectively granted to the originator, or UE 1, of the communication session based at least in part upon probabilistic information associated with session target acceptance of, or joinder to, the communication session.

Referring to FIG. 6, a session originator ("UE 1") sends, to the application server 170, a request to initiate a communication session with target UE(s) 2 . . . N, 600. In an example, if N=2, the communication session is intended to be a direct or one-to-one communication session (i.e., between UE 1 and one other UE) that is likely to be supported by the application server 170 via IP unicasting. Otherwise, if N>2, the communication session corresponds to a group communication session that can be supported by the application server 170 via IP unicasting, IP multicasting and/or a combination thereof.

The application server 170 receives the session initiation request from UE 1, and, instead of allocating a floor-grant to UE 1 by default in accordance with either GTP-type or OTP-type floor-grant mechanisms or protocols, the application server 170 determines information associated with a probability that the target UE(s) 2 . . . N will fail to positively acknowledge the one or more call announcement messages, 605.

The information determined in 605 can be any type of information that can be used by the application server 170 to infer the likelihood that none of target UE(s) 2 . . . N will be able to, or willing, to join or accept the announced communication session. For example, the probabilistic information determined at 605 can include (i) the number of target UE(s) (i.e., N−1) to which the call announce message(s) are transmitted and/or (ii) a calculated probability ($P_{FAIL}$) that the target UE(s) 2 . . . N will not accept or answer the call announcement.

After the probabilistic information is determined in 605, the probabilistic information is used by the application server 170 to determine whether to grant the floor to UE 1 before one or more accept call messages are received from a first responder among target UE(s) 2 . . . N, 610. In other words, the probabilistic information is used to select between an OTP-type floor-grant mechanism or protocol and a GTP-type floor-grant mechanism or protocol. As an example, the determination of 610 can include comparing the probabilistic information from 605 with a threshold value. For example, if the probabilistic information corresponds to the number of target UE(s) 2 . . . N that are sent the call announcement, the threshold value may correspond to a threshold number of target UEs. In another example, if the probabilistic information corresponds to a calculated probability, the threshold value may correspond to a threshold probability ($P_T$).

Referring to FIG. 6, in 610, if the application server 170 determines to implement a GTP-type floor-grant mechanism or protocol based on the probabilistic information from 605, the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 610, if the application server 170 determines to implement a OTP-type floor-grant mechanism or protocol based on the probabilistic information from 605, the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

Figure 7A:
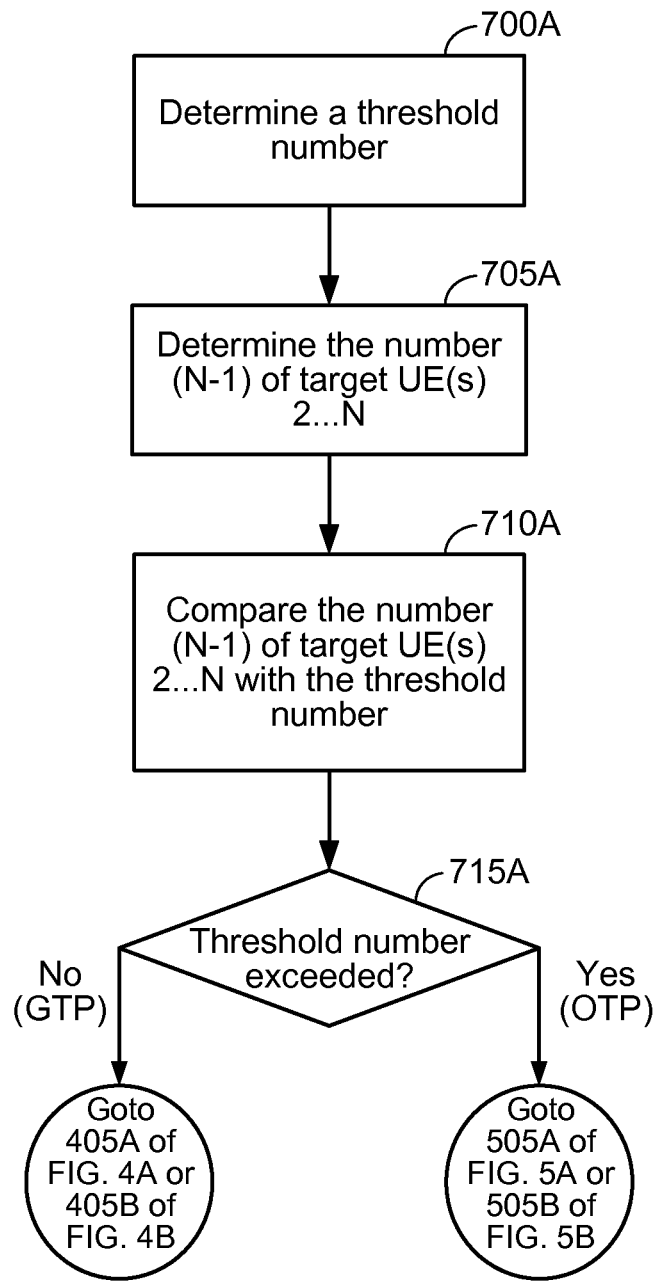
FIG. 7A illustrates an example implementation of a portion of the process of FIG. 6 in accordance with an embodiment of the invention.

FIG. 7A illustrates an example implementation of a portion of the process of FIG. 6 in accordance with an embodiment of the invention. In particular, FIG. 7A illustrates an example implementation of 605 and 610 of FIG. 6 in more detail.

Referring to FIG. 7A, after receiving the session initiation request from UE 1 in 600 of FIG. 6, the application server 170 determines a threshold number of target UEs, 700A. In an example, the threshold number determined at 700A can be a static pre-configured number, such that the determination of 700A corresponds to a loading of a stored value from memory by the application server 170. Alternatively, the threshold number determined at 700A can be dynamically determined or calculated by the application server 170 based on session-specific parameters and/or environmental or system conditions of the wireless communications system.

Figure 7B:
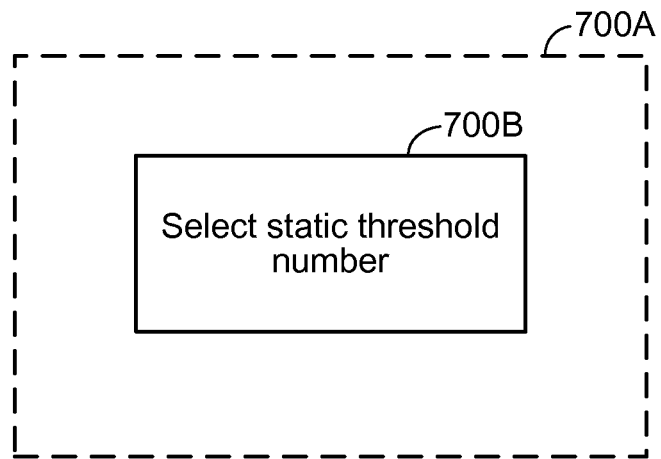
FIG. 7B illustrates an example implementation of a portion of the process of FIG. 7A in accordance with an embodiment of the invention.

In an example, it will be appreciated by one of ordinary skill in the art that the probability that at least one of target UE(s) 2 . . . N will not accept the call announcement message decreases as N increases. In other words, announcing a session to more target UEs will typically increase the likelihood of setting-up the session to at least one of the target UEs. Thus, the application server 170 (or a network operator) may determine through empirical study that call announcement messages sent to a given number (e.g., 3, 4, etc.) of target UEs have a particularly high likelihood of being accepted, in which case the given number can be used as the threshold number determined in 700A. FIG. 7B illustrates an example by which the application server 170 selects a static threshold number, 700B, for the threshold number determination of 700A.

Figure 7C:
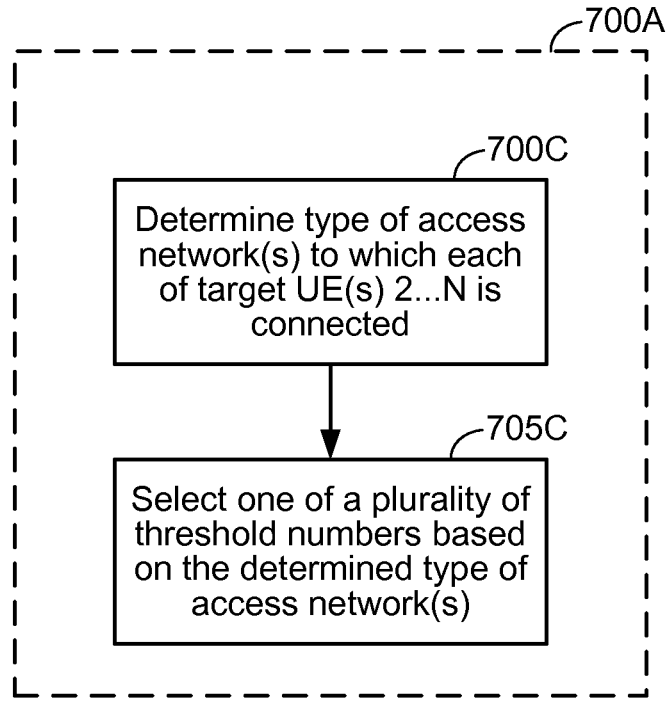
FIG. 7C illustrates another example implementation of a portion of the process of FIG. 7A in accordance with an embodiment of the invention.

In another example, the threshold number can be dynamically determined. For example, a number of factors can affect the success-rate of call set-up, such as time of day, the type of users to be engaged in the communication session, the type of access network (e.g., terrestrial vs. satellite), etc. These factors can be used to weight to the threshold number determined in 700A. For example, communication sessions being set-up during normal work-hours can be associated with a lower threshold number than communication sessions being set-up during off-peak hours because UEs are more likely to respond to call announcements during 'normal' calling times. In another example, communication sessions being set-up between family members or friends can be associated with a lower threshold number than communication sessions being set-up with strangers because UEs are more likely to respond to call announcements from users with closer social relationships. In another example, communication sessions being set-up to target UEs connected via a terrestrial access network can be associated with a lower threshold number than communication sessions to target UEs via a satellite access network because UEs connected to satellite access networks may be on average less likely to ACK call announcements. This example is illustrated with respect to FIG. 7C, whereby the threshold number determination of 700A includes determining the type of access network (e.g., satellite or terrestrial) to which each of target UE(s) 2 . . . N is connected, 700C, and then selecting one of a plurality of threshold numbers based on the determined access network type(s), 705C (e.g., threshold number=5 if any target UE(s) connect via satellite, threshold number=3 if no target UE(s) connect via satellite, etc.).

Thus, the examples above show that the application server 170 can optionally weight the threshold number determined in 700A based on information that can affect the likelihood of call acceptance by the target UE(s) 2 . . . N.

Referring to FIG. 7A, the application server 170 determines the number (N−1) of target UE(s) 2 . . . N to which the call announcement message is to be transmitted, 705A. In an example, for one-to-one or direct calls from UE 1, the number determined in 705A is simply one (1). In another example, the session initiation request from 600 can designate a group of target UE(s). The number of target UE(s) can thereby either be (i) the total number of UEs in the group (except for UE 1), or (ii) the UEs in the group that are currently available. The application server 170 can determine the number of UEs in the group based on UEs that have registered with the application server 170 for the group, in an example. Alternatively, the application server 170 can determine the number of UEs in the group based on UEs that have both registered with the application server 170 for the group and have also indicated their availability to the presence server 170C. For example, it will be appreciated that not all UEs belonging to a particular communication group are always available. In this case, one or more UEs in the group may be turned off, may be out of service, etc. In an example, the application server 170 can query the presence server 170C to determine which UEs among the group are available. Thus, in 705A, the application server 170 attempts to determine the number of target UE(s) 2 . . . N that are expected to have a capability of responding to the call announcement message, in an example.

After determining the threshold number in 700A and the number (N−1) of target UE(s) 2 . . . N in 705A, the application server 170 compares the threshold number with the number (N−1) of target UE(s) 2 . . . N in 710A. In 715A, if the application server 170 determines that the threshold number does not exceed the number (N−1) of target UE(s) 2 . . . N, the application server 170 determines to implement a GTP-type floor-grant mechanism or protocol. Accordingly, the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. In other words, in the embodiment of FIG. 7A, the application server 170 invokes the GTP-type floor-grant mechanism or protocol when the number of target UEs is relatively low. Otherwise, in 715A, if the application server 170 determines that the threshold number exceeds the number (N−1) of target UE(s) 2 . . . N, the application server 170 determines to implement an OTP-type floor-grant mechanism or protocol. Accordingly, the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N. In other words, in the embodiment of FIG. 7A, the application server 170 invokes the OTP-type floor-grant mechanism or protocol when the number of target UEs is relatively high.

Figure 7D:
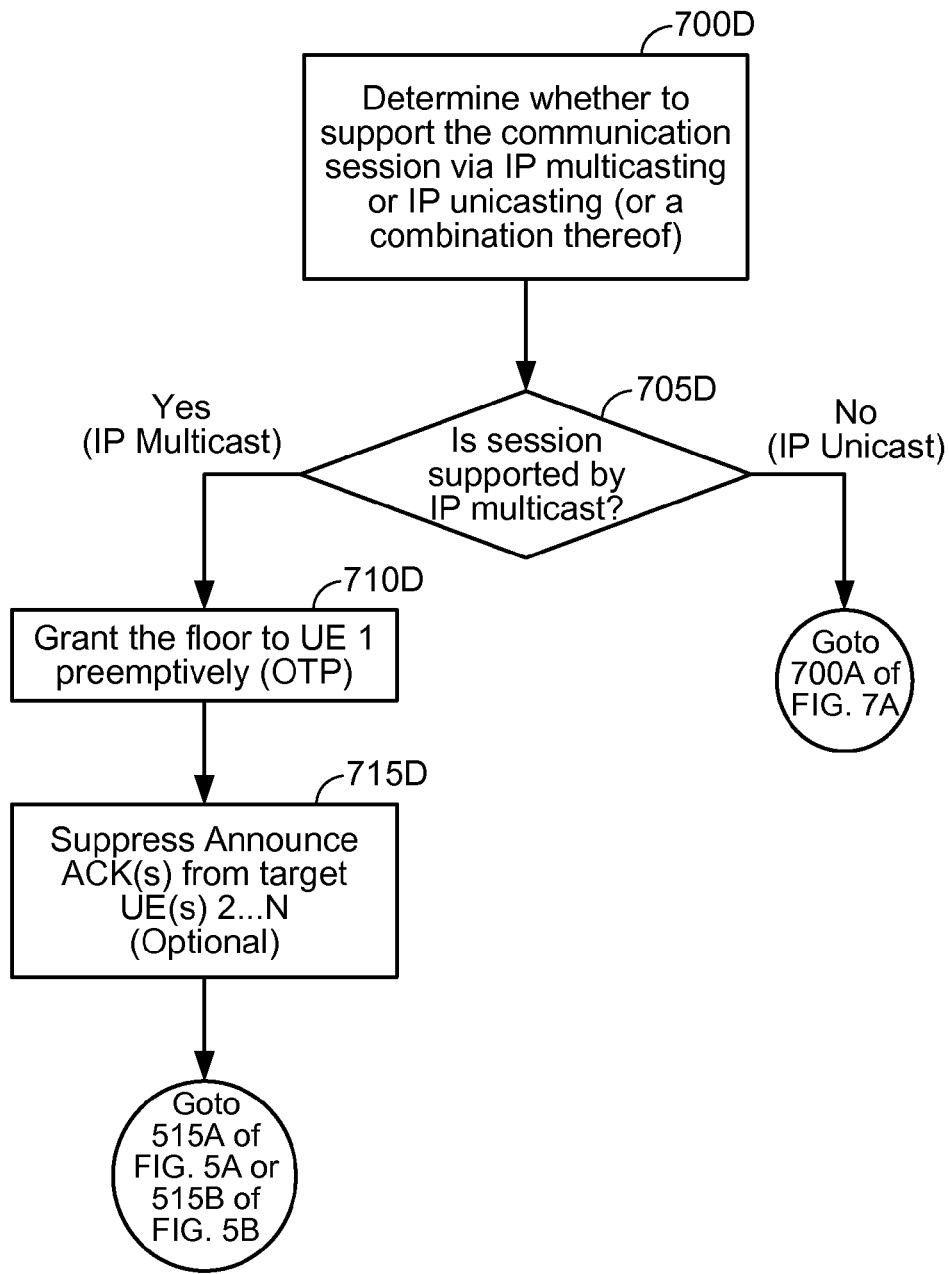
FIG. 7D illustrates an example implementation of a supplemental process that can occur prior to the process of FIG. 7A in accordance with an embodiment of the invention.

FIG. 7D illustrates a variation to the process illustrated with respect to FIG. 7A in accordance with an embodiment of the invention. FIG. 7D is implemented after the application server 170 receives the session initiation request from UE 1 in 600 of FIG. 6 and before 700A of FIG. 7A, whereby the process of FIG. 7A is implemented exclusively for sessions supported via IP unicasting (at least, when FIG. 7D is executed).

Referring to FIG. 7D, upon receiving the session initiation request from UE 1 in 600 of FIG. 6, the application server 170 determines whether to support the communication session via IP unicasting, IP multicasting and/or a combination of IP unicasting and IP multicasting, 700D. In an example, the application server 170 may determine to support the communication session via IP unicasting if there are a relatively low number of UEs in the group, if the UEs in the group are not geographically co-located (e.g., a high number of UEs in the group are in different serving sectors) and/or one or more UEs are 'high-priority' or premium UEs. In another example, the application server may determine to support the communication session via IP multicasting if there are a relatively high number of geographically co-located UEs in the group and/or the UEs in the group are not high-priority or premium UEs. In yet another example, the application server 170 can determine to support the communication session via a combination of IP unicasting and IP multicasting, whereby IP multicasting is used for geographically co-located UEs and IP unicasting is used either for UEs that are not geographically co-located with other UEs and/or for high-priority UEs.

Based on the determination of 700D, the application server 170 determines whether IP multicast is going to be used (at least in part) to support the communication session, 705D. For example, IP multicasting is typically used for announcing communication sessions to relatively large groups. The embodiment of FIG. 7D leverages this information to infer that it is likely that, when announcing a session to a relatively large group via IP multicasting, at least one of the target UEs will probably accept the session. Thus, in 710D, if the application server 170 determines that the communication session will be supported (at least partially) via IP multicasting, the application server 170 grants the floor to UE 1 preemptively, or in accordance with the OTP-type floor-grant mechanism or protocol as shown in FIGS. 5A and 5B.

Also, in cases where there is a high likelihood of obtaining call acceptance from at least one target UE among a group of geographically co-located UEs, as is typical in IP multicasting scenarios, the application server 170 can optionally configure the call announcement messages that are sent to the target UE(s) 2 . . . N to suppress accept call messages, 715B. As will be appreciated, this reduces reverse-link traffic from the target UE(s) 2 . . . N. Examples of how accept call messages from UEs can be suppressed are described in more detail within co-pending U.S. application Ser. No. 12/212,423, entitled "MANAGING ACKNOWLEDGMENT TRANSMISSIONS FROM MULTICAST GROUP MEMBERS OF A MULTICAST GROUP WITHIN A WIRELESS COMMUNICATIONS NETWORK", filed on Sep. 17, 2008, assigned to the assignee of the subject application, and hereby incorporated by reference in its entirety.

After granting the floor to UE 1 in 710D and transmitting the call announce messages to target UE(s) in 715D (with optional call accept message suppression), the process of FIG. 7D advances to 515A of FIG. 5A or 515B of FIG. 5B such that media begins to arrive at the application server 170 from UE 1 for transmission to target UE(s) 2 . . . N. As will be appreciated, in the case where the accept call are suppressed, the accept call or reject call messages from FIGS. 5A and 5B would be omitted due to the suppression.

Turning back to 705D of FIG. 7D, if the application server 170 determines that the communication session will not be supported via IP multicasting, the process advances to 700A of FIG. 7A. Accordingly, in the embodiment of FIG. 7D, the process of FIG. 7A is invoked for communication sessions supported via IP unicasting, whereby the application server 170 invokes the OTP-type floor-grant mechanism or protocol for communication sessions supported via IP multicasting.

FIGS. 7A through 7D are described above as example implementations of the process of FIG. 6 whereby the probabilistic information used to select between OTP-type and GTP-type floor-grant mechanisms or protocols is based in part on a comparison between the number of target UE(s) to which the session is announced and a threshold number. The result of this comparison is thereby configured to be somewhat indicative of the likelihood of the probability that the call will be accepted or joined by one or more of the target UE(s). In another embodiment, described below with respect to FIGS. 8A and 8B, an approximate probability that the application server 170 will obtain session-acceptance or joined by at least one of the target UE(s) 2 . . . N can be calculated. Then, this calculated probability can itself be compared against a threshold probability (PT) to determine whether to invoke OTP-type floor-grant protocol or the GTP-type floor-grant protocol.

Figure 8A:
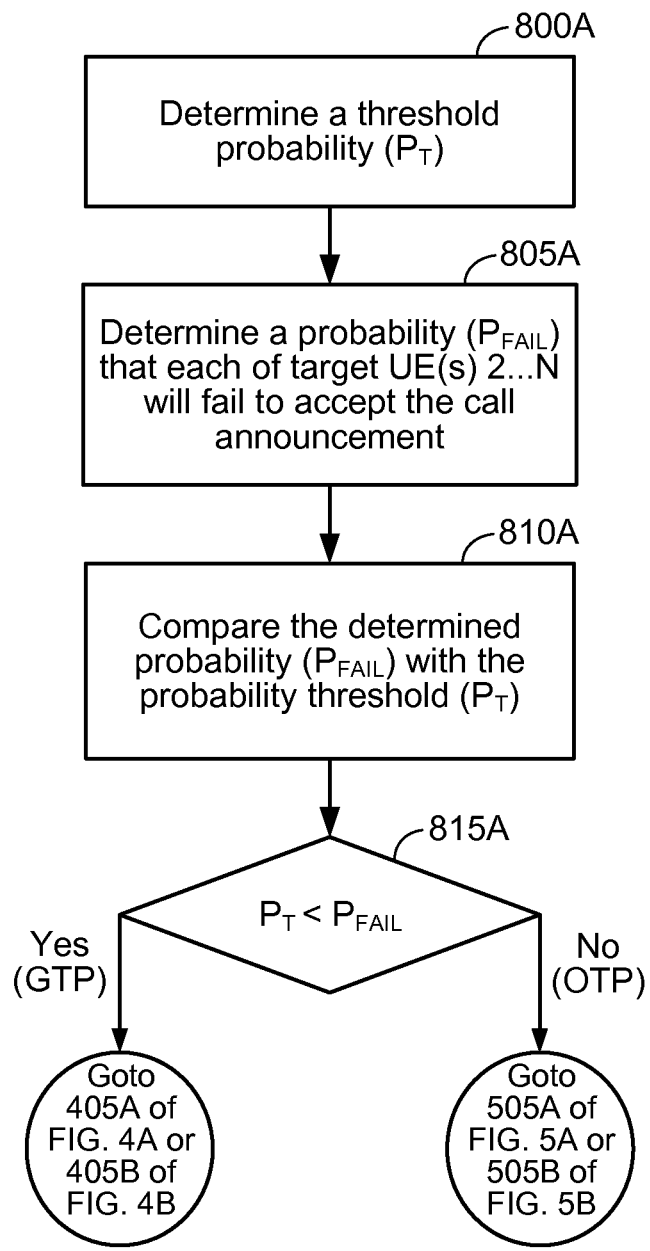
FIG. 8A illustrates an example implementation of a portion of the process of FIG. 6 in accordance with an embodiment of the invention.

FIG. 8A illustrates an example implementation of a portion of the process of FIG. 6 in accordance with an embodiment of the invention. In particular, FIG. 8A illustrates an example implementation of 605 and 610 of FIG. 6 in more detail.

Referring to FIG. 8A, after receiving the session initiation request from UE 1, the application server 170 determines a threshold probability that none of target UE(s) will join the communication session, 800A. The threshold probability is established such that the OTP-type floor-grant protocol's benefit of improved call set-up time is balanced against the GTP-type floor-grant protocol's benefit of reduced false-grant scenarios. The threshold probability may be denoted as $P_T$, whereby $P_T$ can be set to 0.03 (or 3%), 0.01 (or 1%), and so on.

The application server 170 determines a probability, $P_{FAIL}$, that each of target UE(s) 2 . . . N will fail to accept the call announcement, 805A. The probability calculation of 805A can be performed in a number of ways.

For example, assume that the application server 170 determines a current probability of call failure during set-up for a typical one-to-one or direct call to a typical target UE, which may be denoted as $P_{UE\text{-}FAIL}$. In this case, the application server 170 can apply the call failure probability $P_{UE\text{-}FAIL}$ to each of target UE(s) 2 . . . N. Then, the application server 170 determines the number of target UE(s) 2 . . . N, or N−1. Finally, $P_{FAIL}$ can be approximated with the following equation:

$$P_{FAIL} = P_{UE\text{-}FAIL}^{(N-1)} \qquad \text{Equation 1}$$

As will be appreciated, the actual probability that a particular UE will fail to accept a call is not necessarily equal to $P_{UE\text{-}FAIL}$. Rather, $P_{UE\text{-}FAIL}$ is the average rate at which target UEs in the system do not join announced communication sessions. In an example, $P_{UE\text{-}FAIL}$ can be easily computed from the average call accept rate by session targets observed in the past. As will be appreciated, the application server 170 may be able to obtain information permitting the application server 170 to compute a more UE-specific failure probability for one or more of the target UE(s) 2 . . . N. In this case, the application server 170 can use the (potentially) more accurate UE-specific failure probability in place of $P_{UE\text{-}FAIL}$.

For example, assume that N=4, such that UE 1 is attempting to initiate a communication session with UE 2, UE 3 and UE 4. Next, assume that the application server 170 has no special knowledge with regard to UE 2, and as such assumes that UE 2's probability of failing to accept the call announcement for the communication session is $P_{UE\text{-}FAIL}$. However, assume that the application server 170 is aware that UE 3 is in a region of the wireless communications system with relatively low response rates (e.g., UE 3 may be connected to a satellite access network-portion of the RAN 120). In this case, the application server 170 can use a different probability for UE 3, denoted as $P_{UE3}$, where $P_{UE3} > P_{UE-FAIL}$. Next, assume that the application server 170 tracks information related to the past performance of particular UEs with regard to their respective rate of failing to join announced communication sessions, and further that the application server 170 is aware that UE 4 has a very high rate of call acceptance (or a low rate of call failure). Accordingly, the application server 170 can use a different probability for UE 4, denoted as $P_{UE4}$, where $P_{UE4} < P_{UE-FAIL}$. The application server 170 can then approximate $P_{FAIL}$ for a call announcement to UEs 2 . . . 4 as follows:

$$P_{FAIL} = P_{UE-FAIL} * P_{UE3} * P_{UE4} \qquad \text{Equation 2}$$

Accordingly, it will be appreciated that the application server 170 can use UE-specific information to weight the calculation of $P_{FAIL}$ in order to obtain a better approximation of whether the call announcement for a particular communication session will fail.

After determining the probability threshold $P_T$ (800A) and the call failure probability $P_{FAIL}$ (805A), the application server 170 compares the probability threshold $P_T$ with the call failure probability $P_{FAIL}$, 810A. Based on the comparison of 810A, the application server 170 determines whether the probability threshold $P_T$ is less than the call failure probability $P_{FAIL}$, 815A. As will be appreciated, a condition of $P_T < P_{FAIL}$ implies a relatively high probability of call failure (i.e., invoke the GTP-type floor-grant protocol), whereby a condition of $P_T \geq P_{FAIL}$ implies a relatively low probability of call failure (i.e., invoke the OTP-type floor-grant protocol).

If the application server 170 determines that the probability threshold $P_T$ is less than the call failure probability $P_{FAIL}$ in 815A, the application server 170 determines to implement the GTP-type floor-grant mechanism or protocol. Accordingly, the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 815A, if the application server 170 determines that the probability threshold $P_T$ is not less than the call failure probability $P_{FAIL}$ in 815A, the application server 170 determines to implement the OTP-type floor-grant mechanism or protocol. Accordingly, the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

Figure 8B:
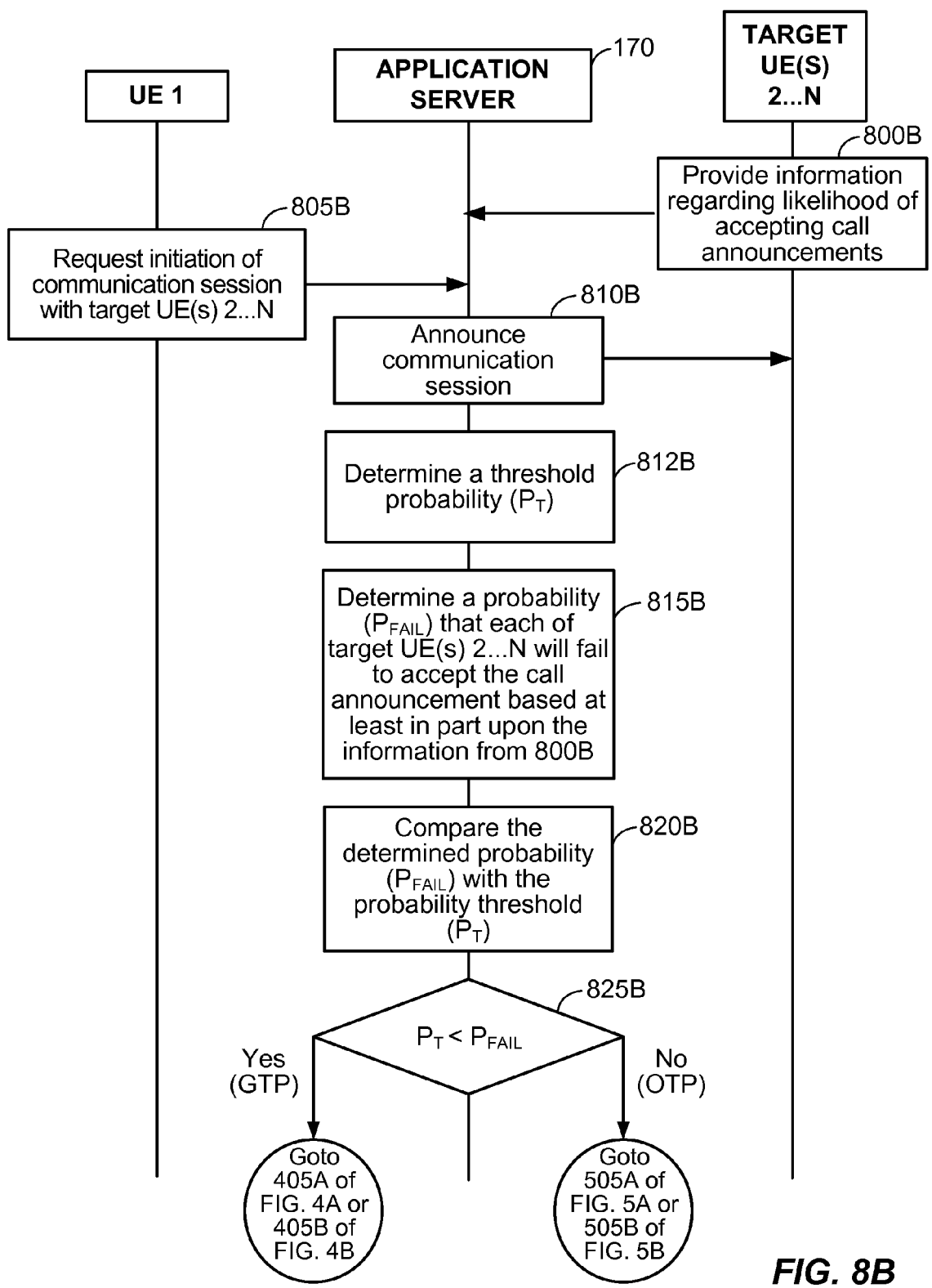
FIG. 8B illustrates an implementation of the process of FIG. 8A whereby an application server determines the call failure probability based at least in part upon user equipment (UE)-specific information provided from one or more of the target UE(s) in accordance with an embodiment of the invention.

FIG. 8B illustrates an implementation of the process of FIG. 8A whereby the application server 170 determines the call failure probability $P_{FAIL}$ based at least in part upon UE-specific information provided from one or more of the target UE(s) 2 . . . N in accordance with an embodiment of the invention.

Referring to FIG. 8B, assume that one or more of target UE(s) 2 . . . N provide information regarding their respective likelihood of accepting call announcements, 800B. For example, a given UE among target UE(s) 2 . . . N may indicate to the application server 170 that its user is going to sleep and will not be responding to call announcements for a period of time. Alternatively, the given UE may provide calendar information that includes time-blocks whereby the given UE is unlikely to answer call announcements, such as business meetings, airplane trips and so on. Thus, the UE-specific information of 800B may correspond to device-specific information regarding call answer probability, or alternatively may correspond to user-specific information regarding call answer probability (i.e., even where the UE is available the user may not want to answer the call).

At some later point in time, UE 1 requests initiation of the communication session, 805B, and the application server 170 announces the communication session, 810B. The application server 170 determines the threshold probability $P_T$, 812B (as in 805A of FIG. 8A). The application server 170 determines the call failure probability $P_{FAIL}$ based at least in part upon the UE-specific information from 800B, 815B. In other words, as discussed above with respect to Equation 2, the application server 170 may weight the call failure probability $P_{FAIL}$ based on the UE-specific information. Next, 820B and 825B correspond to 810A and 815A, respectively, of FIG. 8A, and as such will not be described further for the sake of brevity.

In addition to the 'false-grant' probability, another important performance metric associated with setting-up communication sessions is session setup delay. For example, in some networks where propagation delays are relatively high, the advantages associated with quickly granting the floor to the originator may outweigh the risk of a false grant.

For example, in a CDMA EV-DO Rel. 0 network, the paging cycle is set to 5.12 seconds and the roundtrip delay to the target UE(s) is often greater than the paging cycle. When the target for a one-to-one communication session is in this access network, the application server can decide to apply an OTP-type floor grant mechanism. When the target is in an access network where a smaller paging cycle is supported (e.g., CDMA EV-DO Rev. A, W-CDMA, or LTE networks), the application server 170 can decide to apply a GTP-based floor grant mechanism. Also, in general, the propagation delays in Geo-synchronous Earth Orbit (GEO) satellite systems are typically higher than Low Earth Orbit (LEO) satellite systems or terrestrial access networks. For this reason, the application server can decide to apply an OTP-type floor grant mechanism when the session target is being served by a GEO satellite system. Thus, aside from probabilistic information associated with call acceptance, the application server 170 can also consider delay-information associated with call acceptance of target UE(s) to the communication session.

As will be explained in more detail below, the OTP-type floor-grant mechanism or protocol may be invoked for communication sessions established in delay-prone networks and the GTP-type floor-grant mechanism or protocol may be invoke for communication established in 'fast-response' networks, even where the probability of call acceptance by the target UE(s) is the same in both networks.

Figure 9:
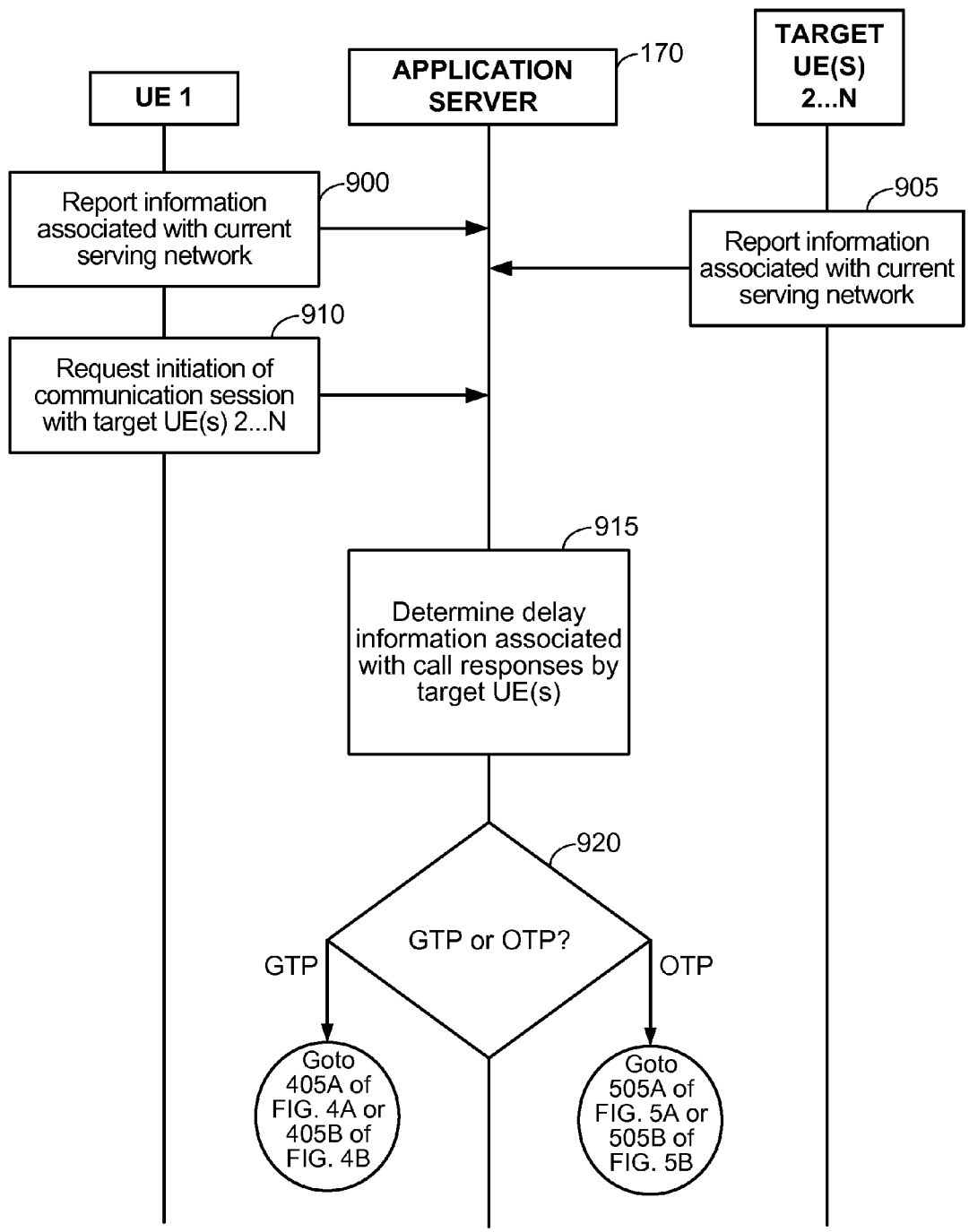
FIG. 9 illustrates a process of selectively granting a floor to an originator of a communication session in accordance with an embodiment of the invention.

FIG. 9 illustrates a process of selectively granting a floor to an originator ("UE 1") of a communication session in accordance with an embodiment of the invention. In particular, FIG. 9 illustrates an example implementation whereby the floor is selectively granted to the originator, or UE 1, of the communication session based at least in part upon delay information associated with session target acceptance of, or joinder to, the communication session.

Referring to FIG. 9, assume that each of UEs 1 . . . N report information associated with their respective current serving network to the application server 170, 900 and 905. For example, UEs 1 . . . N can notify the application server 170 with regard to the type of access network to which the respective UEs are connected, such as a CDMA EV-DO Rel. 0 network, a GEO satellite network, etc.

At some later point in time, a session originator ("UE 1") sends, to the application server 170, a request to initiate a communication session with target UE(s) 2 . . . N, 910. In an example, if N=2, the communication session is intended to be a direct or one-to-one communication session (i.e., between UE 1 and one other UE) that is likely to be supported by the application server 170 via IP unicasting. Otherwise, if N>2, the communication session corresponds to a group communication session that can be supported by the application server 170 via IP unicasting, IP multicasting and/or a combination thereof.

The application server 170 receives the session initiation request from UE 1, and, instead of allocating a floor-grant to UE 1 by default in accordance with either GTP-type or OTP-type floor-grant mechanisms or protocols, the application server 170 determines delay information associated with call responses from the target UE(s) 2 . . . N, 915.

The delay information determined in 915 can be any type of information that can be used by the application server 170 to infer how long it is likely to take the target UE(s) to respond to a call announcement message. For example, as noted above, certain satellite networks (e.g., GEO satellite networks, etc.) may be associated with high propagation delays, which delays response-times from the target UE(s). Thus, the delay information can correspond to an expected wireless propagation delay from an access point to the target UE(s), in an example. In another example, certain networks (e.g., CDMA EV-DO Rel. 0 networks, etc.) can have relatively long paging cycles, which delays response-times from the target UE(s) due to longer waits between pages. Thus, the delay information can correspond to an expected paging delay from an access point to the target UE(s), in an example. Alternatively, a total session set-up delay expectation to one or more of the target UE(s) can be computed and used for the delay information in 915. Alternatively, the network type(s) to which the target UE(s) are connected can be used to infer associated delay information in 915.

After the delay information is determined in 915, the delay information is used by the application server 170 to determine whether to grant the floor to UE 1 before one or more accept call messages are received from a first responder among target UE(s) 2 . . . N, 920. In other words, the delay information is used to select between an OTP-type floor-grant mechanism or protocol and a GTP-type floor-grant mechanism or protocol. As an example, the determination of 920 can include comparing the delay information from 915 with a threshold value. For example, if the delay information corresponds to an expected propagation delay associated with the access network(s) of the target UE(s), the threshold value may correspond to a propagation delay threshold. In another example, if the delay information corresponds to an expected paging delay associated with the access network(s) of the target UE(s), the threshold value may correspond to a paging delay threshold.

Referring to FIG. 9, in 920, if the application server 170 determines to implement a GTP-type floor-grant mechanism or protocol based on the delay information from 915, the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 920, if the application server 170 determines to implement a OTP-type floor-grant mechanism or protocol based on the delay information from 915, the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

Figure 10A:
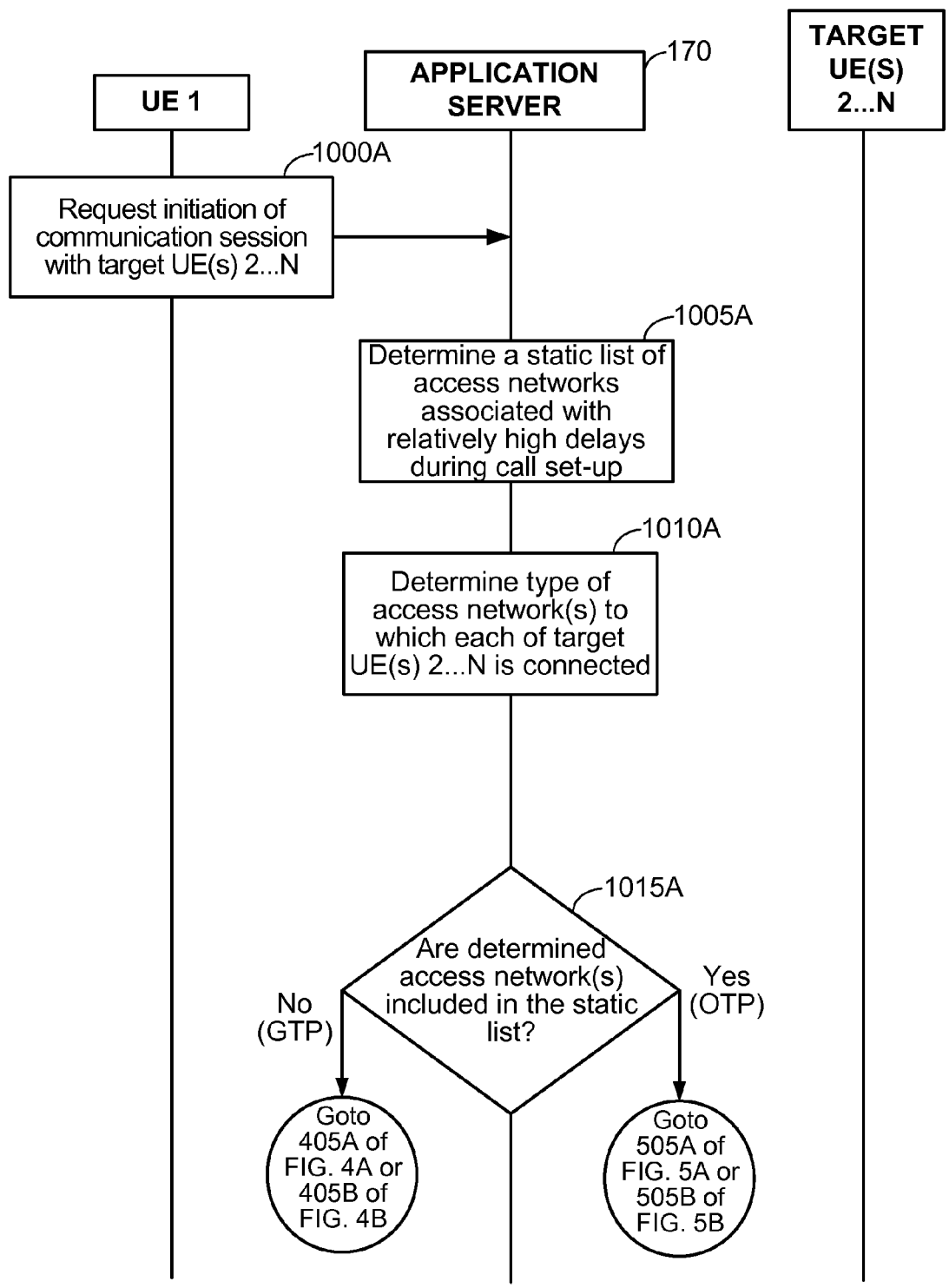
FIG. 10A illustrates an example implementation of the process of FIG. 9 in accordance with an embodiment of the invention.

FIG. 10A illustrates an example implementation of the process of FIG. 9 in accordance with an embodiment of the invention. Referring to FIG. 10A, a session originator ("UE 1") sends, to the application server 170, a request to initiate a communication session with target UE(s) 2 . . . N, 1000A (e.g., as in 910 of FIG. 9). The application server 170 receives the session initiation request from UE 1, and, instead of allocating a floor-grant to UE 1 by default in accordance with either GTP-type or OTP-type floor-grant mechanisms or protocols, the application server 170 determines a static list of access networks that are associated with relatively high delays during call set-up, 1005A. For example, the static list of access networks determined in 1005A can include CDMA EV-DO Rel. 0 networks, which have relatively high call set-up delays due to their paging cycles, and also GEO satellite networks, which have relatively high call set-up delays due to the propagation paths between their satellite access points and the terrestrial-based target UE(s). As will be appreciated, other types of networks can be included in the static list as well.

The application server 170 also determines the type of access network(s) to which each of target UE(s) 2 . . . N is connected, 1010A (e.g., similar to 700C of FIG. 7C). In an example, the determination of 1010A can be based on the serving networks reports (not shown explicitly in FIG. 10A) as in 900 and/or 905 of FIG. 9. As will be appreciated, the determination of the type of access network(s) in 1010A corresponds to the delay information of 915 of FIG. 9, in an embodiment, because delay information associated with call responses the target UE(s) can be inferred from their respective access network type.

The application server 170 then determines whether the type of access network(s) for the target UE(s) determined in 1010A is included in the static list of 1005A, 1015A. For example, depending on the implementation, 1010A can determine whether at least one of the target UE(s)' respective access networks is included in the static list, whether a majority of the target UE(s)' respective access networks are included in the static list, or alternatively whether all of the target UE(s)' respective access networks are included in the static list. Based on the determination of 1015A, the application server 170 can determine whether to implement the GTP-type floor-grant mechanism or the OTP-type floor-grant mechanism. Generally, if a relatively high proportion of the target UE(s)' access network types are determined to be in the static list in 1015A, then call set-up will be expected to undergo relatively high-delays before call responses are obtained at the application server 170, such that the application server 170 implements the OTP-type floor-grant mechanism. Otherwise, if a relatively low proportion of the target UE(s)' access network types are determined to be in the static list in 1015A, then call set-up will be expected to undergo relatively low-delays before call responses are obtained at the application server 170, such that the application server 170 implements the GTP-type floor-grant mechanism. Referring to FIG. 10A, in 1015A, if the application server 170 determines to implement a GTP-type floor-grant mechanism or protocol, the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 1015A, if the application server 170 determines to implement a OTP-type floor-grant mechanism or protocol, the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

Figure 10B:
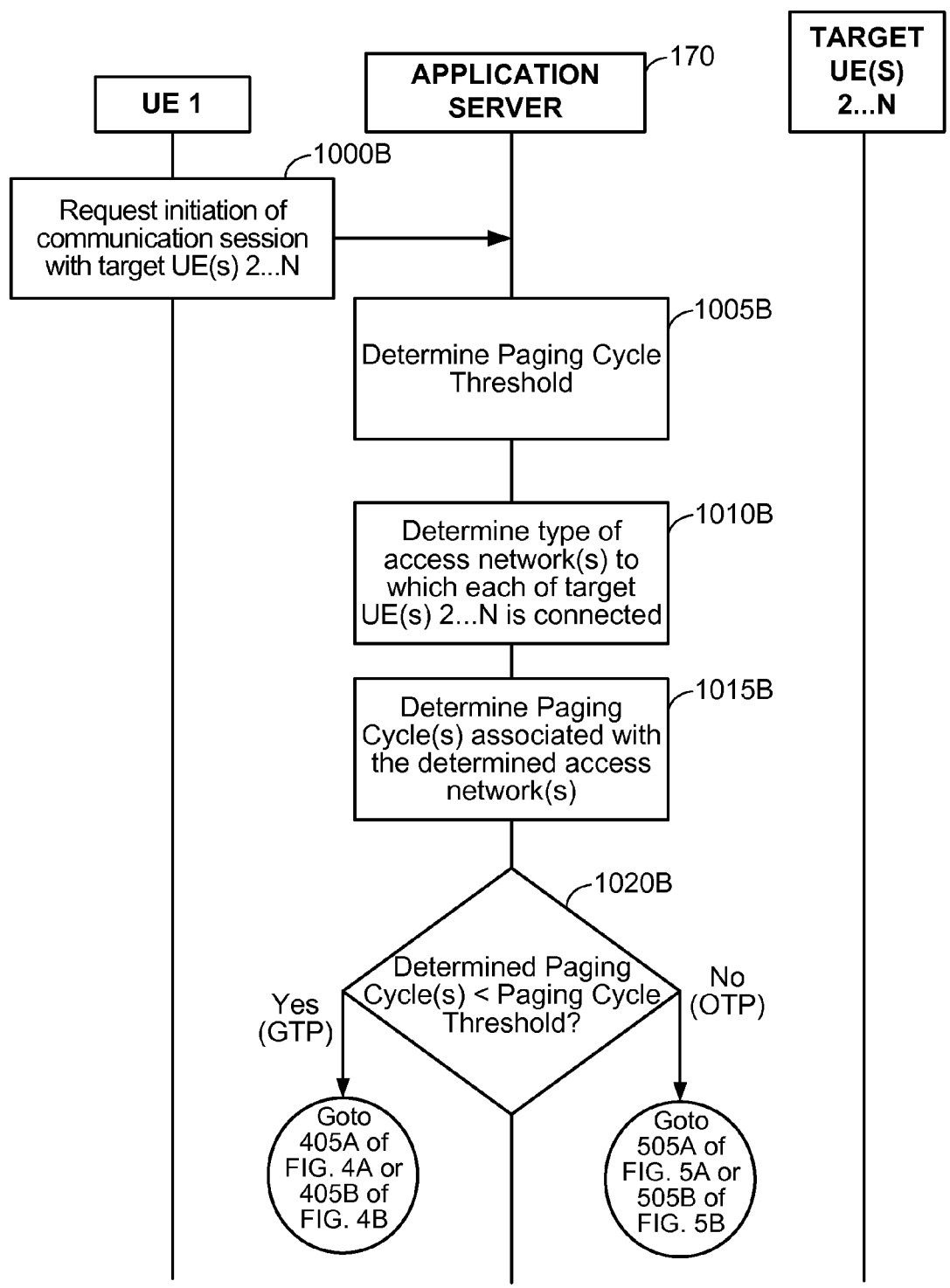
FIG. 10B illustrates an example implementation of the process of FIG. 9 in accordance with another embodiment of the invention.

FIG. 10B illustrates an example implementation of the process of FIG. 9 in accordance with another embodiment of the invention. Referring to FIG. 10B, a session originator ("UE 1") sends, to the application server 170, a request to initiate a communication session with target UE(s) 2 . . . N, 1000B (e.g., as in 910 of FIG. 9). The application server 170 receives the session initiation request from UE 1, and, instead of allocating a floor-grant to UE 1 by default in accordance with either GTP-type or OTP-type floor-grant mechanisms or protocols, the application server 170 determines a paging cycle threshold (e.g., 1 second, 2 seconds, 3 seconds, etc.), 1005B. In an embodiment, the paging cycle threshold can be established from empirical study whereby the OTP-type floor-grant mechanism achieves acceptable performance in association with networks that have paging cycles above the paging cycle threshold and the GTP-type floor-grant mechanism achieves acceptable performance in association with networks that have paging cycles below the paging cycle threshold.

The application server 170 also determines the type of access network(s) to which each of target UE(s) 2 . . . N is connected, 1010B (e.g., similar to 700C of FIGS. 7C and 1010A of FIG. 10A). In an example, the determination of 1010B can be based on the serving networks reports (not shown explicitly in FIG. 10B) as in 900 and/or 905 of FIG. 9. The application server 170 then determines expected paging cycles associated with the type of access network(s) determined in 1010B, 1015B. As will be appreciated, the determination of the associated paging cycle(s) in 1015B corresponds to the delay information of 915 of FIG. 9, in an embodiment, because delay information associated with call responses by the target UE(s) can be inferred from their respective paging cycle(s).

The application server 170 then determines whether the paging cycle(s) determined in 1015B are less than the paging cycle threshold from 1005B, 1020B. For example, if each of target UE(s) are connected to the same type of network, the paging cycle of the network is compared against the paging cycle threshold in 1020B. Alternatively, if two or more of the target UE(s) are connected to different networks, the application server 170 can compute an average paging cycle for the target UE(s) and can use the average paging cycle in the comparison with the paging cycle threshold in 1020B. In another alternative example, instead of using the average paging cycle for the target UE(s) in the comparison, the application server 170 can use the $50^{th}$ percentile (e.g., median) paging cycle from among target UE(s) 2 . . . N, the $95^{th}$ percentile paging cycle from among target UE(s) 2 . . . N, and so on.

Referring to FIG. 10B, in 1020B, if the application server 170 determines to implement a GTP-type floor-grant mechanism or protocol based on the paging cycle comparison (e.g., for CDMA EV-DO Rev. A, W-CDMA, or LTE networks), the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 1020B, if the application server 170 determines to implement a OTP-type floor-grant mechanism or protocol based on the paging cycle comparison (e.g., for CDMA EV-DO Rel. 0 networks), the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

Figure 10C:
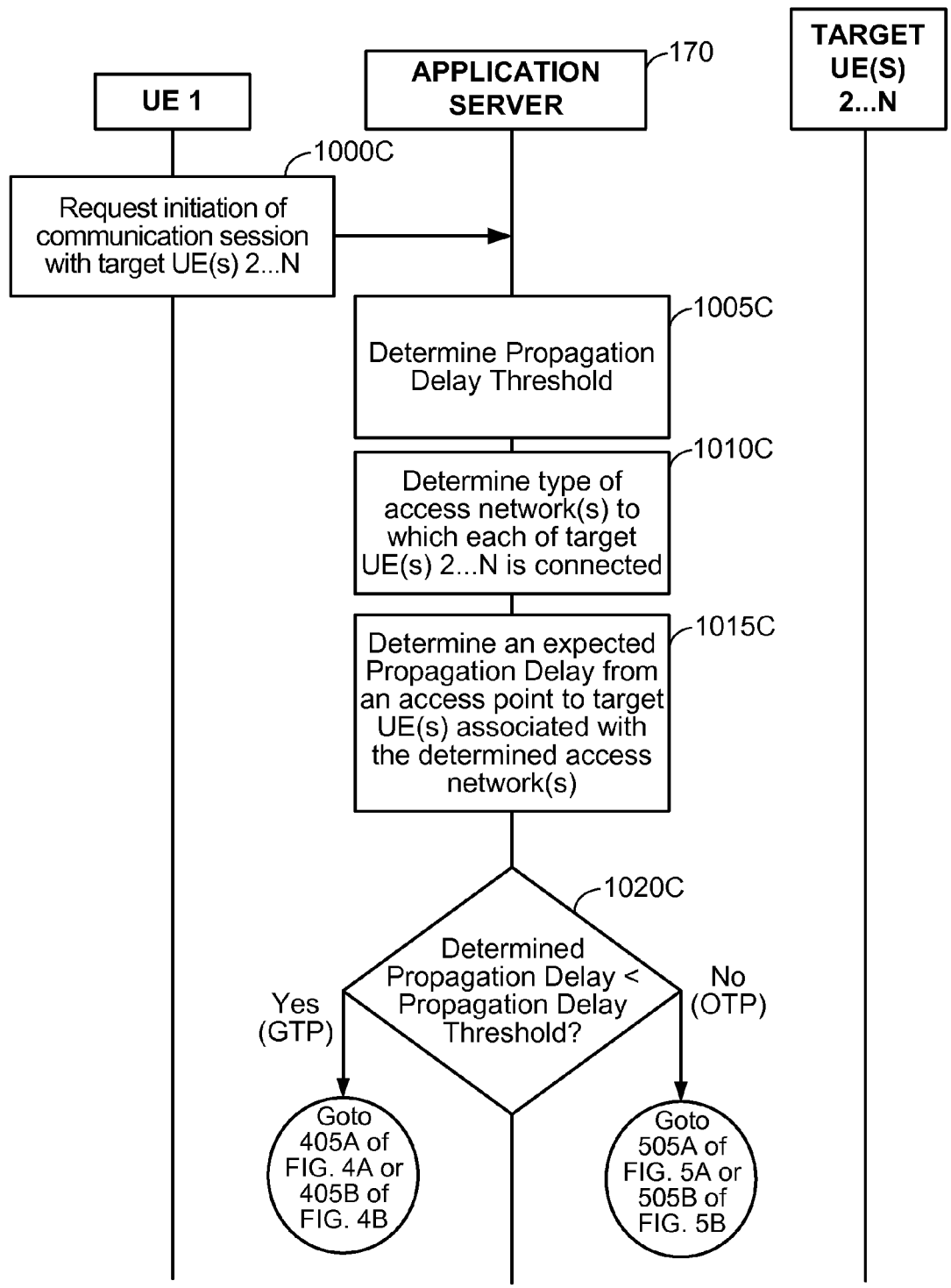
FIG. 10C illustrates another example implementation of the process of FIG. 9 in accordance with another embodiment of the invention.

FIG. 10C illustrates another example implementation of the process of FIG. 9 in accordance with another embodiment of the invention. Referring to FIG. 10C, a session originator ("UE 1") sends, to the application server 170, a request to initiate a communication session with target UE(s) 2 . . . N, 1000C (e.g., as in 910 of FIG. 9). The application server 170 receives the session initiation request from UE 1, and, instead of allocating a floor-grant to UE 1 by default in accordance with either GTP-type or OTP-type floor-grant mechanisms or protocols, the application server 170 determines a propagation delay threshold (e.g., 500 milli-seconds, 1 second, 2 seconds, etc.), 1005C. In an embodiment, the propagation delay threshold can be established from empirical study whereby the OTP-type floor-grant mechanism achieves acceptable performance in association with networks that have propagation delays above the propagation delay threshold and the GTP-type floor-grant mechanism achieves acceptable performance in association with networks that have propagation delays below the propagation delay threshold.

The application server 170 also determines the type of access network(s) to which each of target UE(s) 2 . . . N is connected, 1010C (e.g., similar to 700C of FIG. 7C, 1010A of FIGS. 10A and 1010B of FIG. 10B). In an example, the determination of 1010C can be based on the serving networks reports (not shown explicitly in FIG. 10C) as in 900 and/or 905 of FIG. 9. The application server 170 then determines expected propagation delay(s) (e.g., between the access point of the network and the target UE(s)) associated with the type of access network(s) determined in 1010C, 1015C. As will be appreciated, the determination of the associated propagation delay(s) in 1015C corresponds to the delay information of 915 of FIG. 9, in an embodiment, because delay information associated with call responses from the target UE(s) can be inferred from their respective propagation delay(s).

The application server 170 then determines whether the propagation delay(s) determined in 1015C are less than the propagation delay threshold from 1005C, 1020C. For example, if each of target UE(s) are connected to the same type of network, the propagation delay of the network is compared against the propagation delay threshold in 1020C. Alternatively, if two or more of the target UE(s) are connected to different networks, the application server 170 can compute an average propagation delay for the target UE(s) and can use the average propagation delay in the comparison with the propagation delay threshold in the comparison of 1020C. In another alternative example, instead of the average propagation delay for the target UE(s), the application server 170 can use the $50^{th}$ percentile (e.g., median) expected propagation delay from among target UE(s) 2 . . . N, the $95^{th}$ percentile expected propagation delay from among target UE(s) 2 . . . N, and so on.

Referring to FIG. 10C, in 1020C, if the application server 170 determines to implement a GTP-type floor-grant mechanism or protocol based on the paging cycle comparison (e.g., for LEO or terrestrial access networks), the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 1020C, if the application server 170 determines to implement a OTP-type floor-grant mechanism or protocol based on the paging cycle comparison (e.g., for GEO networks), the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

As will be appreciated, the paging cycle delay (e.g., FIG. 10B) and the propagation delay (e.g., FIG. 10C) are two important components that factor into the total delay for setting up the communication session. While FIGS. 10B and 10C are directed to evaluating these individual components, FIG. 10D is directed to an embodiment whereby the expected session set-up delay for the communication session is determined and used to select between OTP-type and GTP-type floor-grant protocols.

Figure 10D:
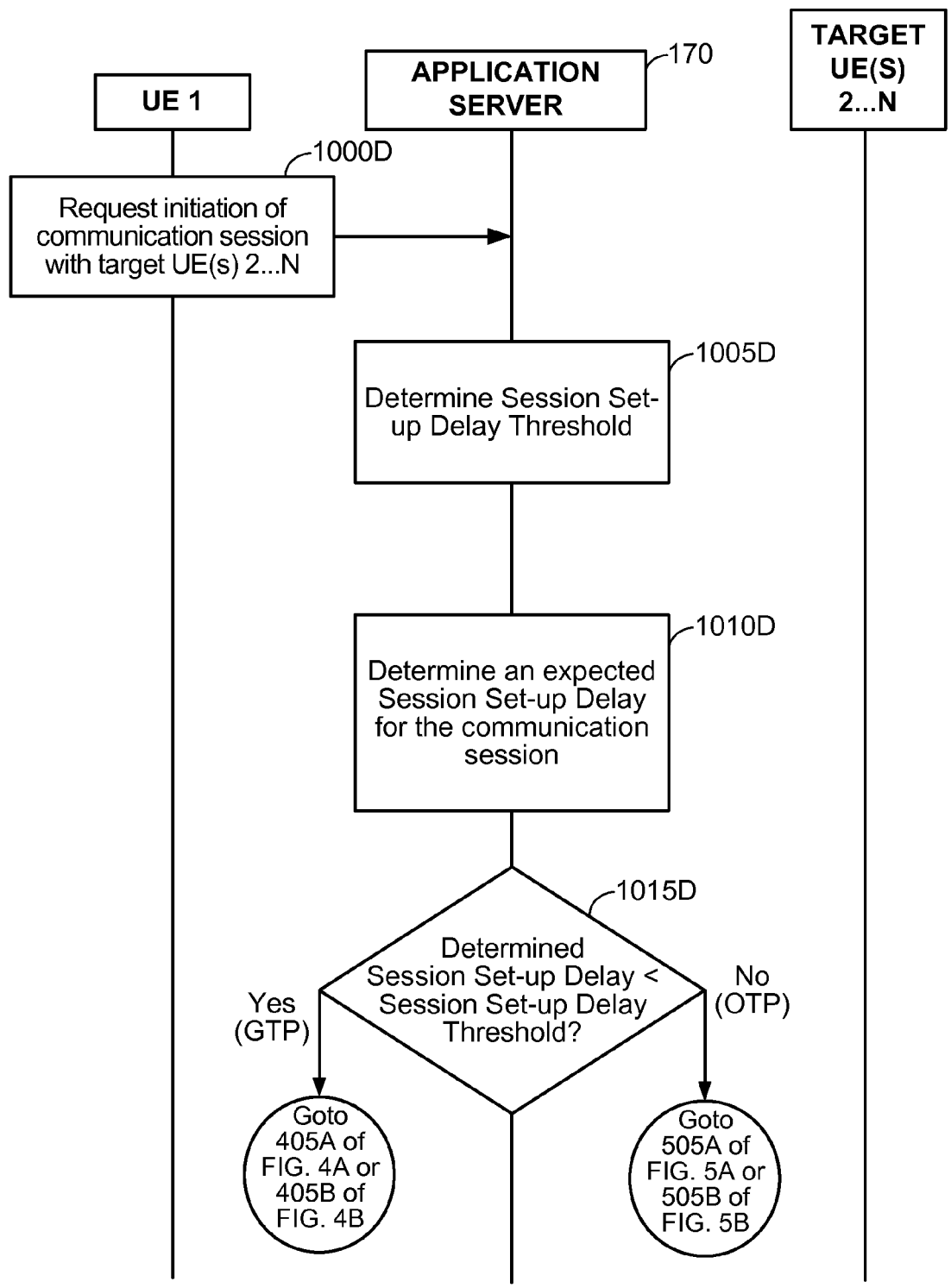
FIG. 10D illustrates another example implementation of the process of FIG. 9 in accordance with another embodiment of the invention.

FIG. 10D illustrates another example implementation of the process of FIG. 9 in accordance with another embodiment of the invention. Referring to FIG. 10D, a session originator ("UE 1") sends, to the application server 170, a request to initiate a communication session with target UE(s) 2 . . . N, 1000D (e.g., as in 910 of FIG. 9). The application server 170 receives the session initiation request from UE 1, and, instead of allocating a floor-grant to UE 1 by default in accordance with either GTP-type or OTP-type floor-grant mechanisms or protocols, the application server 170 determines a session set-up delay threshold (e.g., 2 seconds, 3 seconds, 4 seconds, etc.), 1005D. In an embodiment, the session set-up delay threshold can be established from empirical study whereby the OTP-type floor-grant mechanism achieves acceptable performance in association with networks that have session set-up delay delays above the session set-up delay threshold and the GTP-type floor-grant mechanism achieves acceptable performance in association with networks that have session set-up delays below the session set-up delay threshold.

The application server 170 then determines or calculates an expected session set-up delay for the communication session, 1010D. In an example, the session set-up delay can be based on the network type(s) of the target UE(s) as in FIG. 10A, the expected paging cycle delay from FIG. 10B and/or the expected propagation delay from FIG. 10C. The session set-up delay can also include other factors such as backhaul delays, user delays that occur while users decide whether or not to answer the call announcement message, and so on. Thus, the session set-up delay in 1010D is an estimate of the time duration between the call announcement message and when a given target UE will provide a response to the call announcement message. For example, the session set-up delay determined in 1010D can correspond to the average expected session set-up delay among target UE(s) 2 . . . N, the $50^{th}$ percentile (e.g., median) expected session set-up delay from among target UE(s) 2 . . . N, the $95^{th}$ percentile expected session set-up delay from among target UE(s) 2 . . . N, and so on.

The application server 170 then determines whether the session set-up delay determined in 1010D is less than the session set-up delay threshold from 1005D, 1015D. Referring to FIG. 10D, in 1015D, if the application server 170 determines to implement a GTP-type floor-grant mechanism or protocol based on the session set-up delay comparison, the process advances to 405A of FIG. 4A or 405B of FIG. 4B whereby the application server 170 transmits the call announcement message(s) and then waits to receive an accept call message from a first responder among target UE(s) 2 . . . N before granting the floor to the session originator or UE 1. Otherwise, in 1015D, if the application server 170 determines to implement a OTP-type floor-grant mechanism or protocol based on the session set-up delay comparison, the process advances to 505A of FIG. 5A or 505B of FIG. 5B whereby the application server 170 transmits the call announcement message(s) and then grants the floor to the session originator or UE 1 before receiving an accept call message from a first responder among target UE(s) 2 . . . N.

Above, embodiments have been described whereby the decision between the OTP-type and GTP-type floor-grant mechanisms is based on either probabilistic information associated with a failure of target UE(s) to accept a call announcement message (e.g., as in FIGS. 6 through 8B) or session set-up delay (e.g., as in FIGS. 9 through 10D). In another embodiment of the invention, both the probabilistic information associated with call-accept failure and session set-up delay can be taken into account in the selection between the OTP-type and GTP-type floor-grant mechanisms.

Figure 11:
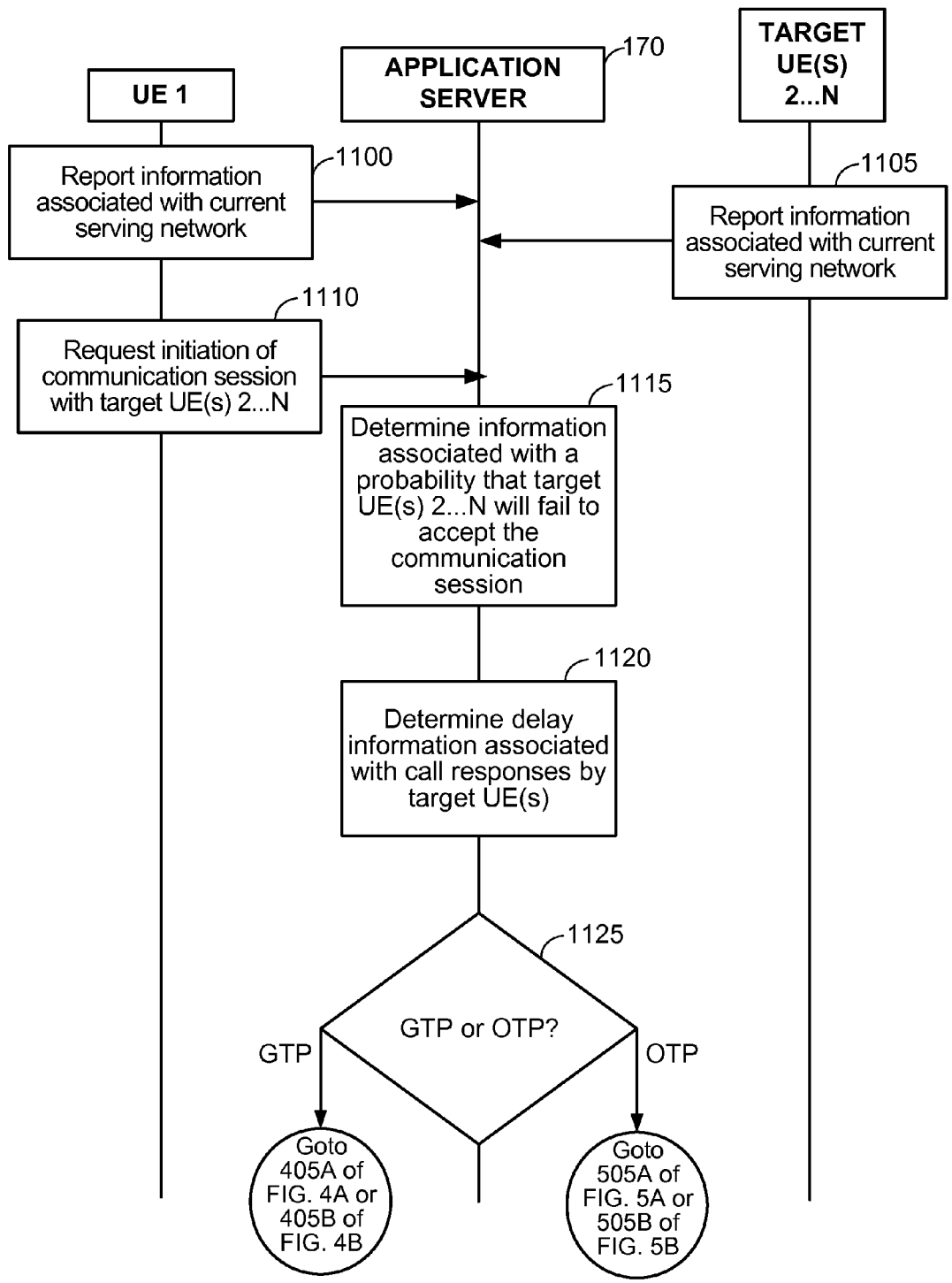
FIG. 11 illustrates another process of selectively granting a floor to an originator of a communication session in accordance with an embodiment of the invention.

FIG. 11 illustrates another process of selectively granting a floor to an originator ("UE 1") of a communication session in accordance with an embodiment of the invention. Referring to FIG. 11, in 1100 and 1105, UEs 1 . . . N each report information associated with the respective serving networks, as in 900 and 905 of FIG. 9, respectively. At some later point in time, in 1110, UE 1 requests initiation of a communication session to UEs 2 . . . N, as in 910 of FIG. 9 and/or 600 of FIG. 6.

At this point, the application server 170 determines information associated with a probability that UE(s) 2 . . . N will fail to accept the communication session, 1115, and the application server 170 further determines delay information associated with call responses by the target UE(s) 2 . . . N, 1120. In an example, the determination of 1115 can correspond to 605 of FIG. 6, and the determination of 1120 can correspond to 915 of FIG. 9. The application server 170 then uses the information determined in 1115 and 1120 to select between the OTP-type and GTP-type floor-grant mechanisms for the communication session, 1125.

In an example, referring to FIG. 11, the application server 170 can compute the probability of the target UE(s) 2 . . . N fail to accept the call within a given delay threshold (e.g., 1 sec, 2 sec, etc). For example, based on the determination from 1115, the application server 170 can determine a certain set of target UEs are unlikely to respond to the call announcement message at all. Then, from the remaining target UEs that are expected to provide some type of response to the call announcement message, the determination of 1120 can determine (e.g., based on the respective network type(s) reported in 1100 and 1105) which target UEs are expected to be able to provide a response within a threshold period of time.

For example, in general, the probability of call-response failure within the threshold period of time will be smaller for target UEs in "fast-response" networks than those in "slow-response" networks. For example, the probability of a target in 1xEV-DO Rev. A network (e.g., having paging cycle of 213.33 msec) failing to accept the call within the threshold period of time (e.g., 1 second) may be smaller than the probability of a target UE in 1xEV-DO Rel. 0 network (e.g., having paging cycle of 5.12 seconds). When most targets of an incident call are located in the 1xEV-DO Rev. A network, the probability of the application server 170 not getting any accept call message from any of the targets within the given delay threshold will be relatively small. If the probability is smaller than a given threshold ($P_{no\text{-}accept\text{-}within\text{-}time\ threshold}$), the application server 170 selects the GTP-based floor grant mechanism in 1125. On the other hand, when zero or only few targets are located in a 1xEV-DO Rev. A network and a substantial number of other targets are located in a 1xEV-DO Rel. 0 network, it is likely that the probability of the application server 170 not getting any accept call message from any of the targets within the given delay threshold is not too small.

If the probability is greater than the given threshold ($P_{no\text{-}accept\text{-}within\text{-}time\ threshold}$), the application server 170 selects the OTP-based floor grant mechanism.

While above-described embodiments of the invention have generally been described with respect to terminology that is specific to CDMA, W-CDMA and/or EV-DO protocols, it will be appreciated that other embodiments of the invention can be modified to comply with other wireless telecommunication protocols, such as UMTS LTE and/or SAE, in an example. For example, in a UMTS implementation, the above-described call flows are still generally applicable. However, the terminology of PDP context, RNC (or RNC 122), SGSN and GGSN may instead be described as Evolved Packet System (EPS) bearer, eNodeB, Serving Gateway (GW) and packet data network (PDN) GW, respectively. Accordingly, the technical modifications to conform the CDMA or WCDMA implementation described above to a LTE, LTE-Advance or any other radio access network implementation are well within the abilities of one of ordinary skill in the art.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of setting-up a communication session within a wireless
   communications system, comprising:
   receiving, from a session originator, a request to initiate the communication session with a set of session targets;
   transmitting one or more call announcement messages for announcing the communication session to the set of session targets;
   determining information associated with a probability that the set of session targets will fail to accept the announced communication session; and
   selectively granting a floor of the communication session to the session originator based on the determined information:
   wherein the selectively granting step selects between (i) preemptively granting the floor to the session originator before an affirmative acceptance of the announced communication session arrives from one or more of the set of session targets and (ii) waiting until after the affirmative acceptance of the announced communication session arrives from the one or more of the set of session targets before granting the floor to the session originator.

2. The method of claim 1, wherein the determining step includes:
   determining a threshold number;
   determining a number of session targets among the set of session targets; and
   comparing the threshold number with the number of session targets,
   wherein the selectively granting step is based on the result of the comparison.

3. The method of claim 2, wherein the threshold number corresponds to a static pre-configured threshold number.

4. The method of claim 2, wherein the threshold number corresponds to a dynamically calculated number that is specific to the announced communication session.

5. The method of claim 2, wherein the selectively granting step grants the floor to the session originator in accordance with a Guaranteed Talk Permit (GTP)-type floor-grant protocol if the comparison indicates that the number of session targets does not exceed the threshold number.

6. The method of claim 2, wherein the selectively granting step grants the floor to the session originator in accordance with an Optimistic Talk Permit (OTP)-type floor-grant protocol if the comparison indicates that the number of session targets exceeds the threshold number.

7. The method of claim 1, wherein the determining step includes:
   determining a threshold probability;
   determining a call failure probability for the announced communication session; and
   comparing the threshold probability with the call failure probability,
   wherein the selectively granting step is based on the result of the comparison.

8. The method of claim 7, wherein the determining the call failure probability step is based at least in part upon target-specific information from one or more of the set of session targets indicative of a likelihood that a particular session target or a user of the particular session target will accept the announced communication session.

9. The method of claim 8, wherein the target-specific information is retrieved from a presence server.

10. The method of claim 7, wherein the selectively granting step grants the floor to the session originator in accordance with a Guaranteed Talk Permit (GTP)-type floor-grant protocol if the comparison indicates that the call failure probability exceeds the threshold probability.

11. The method of claim 7, wherein the selectively granting step grants the floor to the session originator in accordance with an Optimistic Talk Permit (OTP)-type floor-grant protocol if the comparison indicates that the call failure probability does not exceed the threshold probability.

12. The method of claim 1, wherein (i) corresponds to a Guaranteed Talk Permit (GTP)-type floor-grant protocol and (ii) corresponds to an Optimistic Talk Permit (OTP)-type floor-grant protocol.

13. The method of claim 1, further comprising:
   determining whether to support the communication session via Internet Protocol (IP) multicasting.

14. The method of claim 13, wherein the selectively granting step is configured to select (i) if the communication session is determined to be supported via IP multicasting.

15. The method of claim 1, wherein, if the communication session is determined to be supported via IP multicasting, the one or more call announcement messages are each configured to suppress a response from the session target.

16. The method of claim 1, wherein the selectively granting step is based upon a given probability that the set of session targets will fail to accept the announced communication session within a threshold period of time.

17. The method of claim 16, wherein the given probability is based upon the determined information in conjunction with delay information associated with when call responses will arrive from the set of session targets in response to the one or more call announcement messages.

18. An application server configured to set-up a communication session within a wireless communications system, comprising:
   means for receiving, from a session originator, a request to initiate the communication session with a set of session targets;
   means for transmitting one or more call announcement messages for announcing the communication session to the set of session targets;
   means for determining information associated with a probability that the set of session targets will fail to accept the announced communication session; and
   means for selectively granting a floor of the communication session to the session originator based on the determined information,
   wherein the means for selectively granting selects between (i) preemptively granting the floor to the session originator before an affirmative acceptance of the announced communication session arrives from one or more of the set of session targets and (ii) waiting until after the affirmative acceptance of the announced communication session arrives from the one or more of the set of session targets before granting the floor to the session originator.

19. An application server configured to set-up a communication session within a wireless communications system, comprising:
   logic configured to receive, from a session originator, a request to initiate the communication session with a set of session targets;
   logic configured to transmit one or more call announcement messages for announcing the communication session to the set of session targets;
   logic configured to determine information associated with a probability that the set of session targets will fail to accept the announced communication session; and
   logic configured to selectively grant a floor of the communication session to the session originator based on the determined information,
   wherein the logic configured to selectively grant selects between (i) preemptively granting the floor to the session originator before an affirmative acceptance of the announced communication session arrives from one or more of the set of session targets and (ii) waiting until after the affirmative acceptance of the announced communication session arrives from the one or more of the set of session targets before granting the floor to the session originator.

20. A non-transitory computer-readable storage medium containing instructions stored thereon, which, when executed by an application server configured to set-up a communication session within a wireless communications system, cause the application server to perform operations, the instructions comprising:
- program code to receive, from a session originator, a request to initiate the communication session with a set of session targets;
- program code to transmit one or more call announcement messages for announcing the communication session to the set of session targets;
- program code to determine information associated with a probability that the set of session targets will fail to accept the announced communication session; and
- program code to selectively grant a floor of the communication session to the session originator based on the determined information,
- wherein the program code to selectively grant selects between (i) preemptively granting the floor to the session originator before an affirmative acceptance of the announced communication session arrives from one or more of the set of session targets and (ii) waiting until after the affirmative acceptance of the announced communication session arrives from the one or more of the set of session targets before granting the floor to the session originator.

* * * * *